United States Patent [19]

Tsukamoto et al.

[11] Patent Number: 5,366,174
[45] Date of Patent: Nov. 22, 1994

[54] TAPE WINDING APPARATUS

[75] Inventors: Hideharu Tsukamoto; Shiro Matsuzaki; Yoshihiko Miyasaka, all of Kanagawa, Japan

[73] Assignee: Sony Magnescale, Inc., Tokyo, Japan

[21] Appl. No.: 102,306

[22] Filed: Aug. 5, 1993

Related U.S. Application Data

[62] Division of Ser. No. 957,473, Oct. 7, 1992.

[30] Foreign Application Priority Data

Oct. 8, 1991 [JP] Japan .................. 3-260386
Oct. 30, 1991 [JP] Japan .................. 3-285072
Nov. 11, 1991 [JP] Japan .................. 3-302033

[51] Int. Cl.⁵ .......................................... B65H 16/00
[52] U.S. Cl. .................... 242/532.1; 156/584; 242/562
[58] Field of Search ............. 242/56 R, 78.8, 58.1, 242/58.4, 58.5; 156/584, 572

[56] References Cited

U.S. PATENT DOCUMENTS

| | | | |
|---|---|---|---|
| 4,210,266 | 7/1980 | Schoettle et al. | 242/56 R X |
| 4,216,052 | 8/1980 | Zielke | 242/56 R X |
| 4,589,608 | 5/1986 | Rehklau et al. | 242/56 R X |
| 5,152,470 | 10/1992 | Farrow et al. | 242/56 R |
| 5,181,669 | 1/1993 | Johnson et al. | 242/58.5 X |

Primary Examiner—Daniel P. Stodola
Assistant Examiner—Eileen A. Dunn
Attorney, Agent, or Firm—Jay H. Maioli

[57] ABSTRACT

A tape winding apparatus, in which a tape drawn from a pancake reel and loaded onto a reel base is wound and accommodated within a cassette, includes a pancake reel exchanging apparatus, wherein at least two pancake reels coaxially disposed with respect to the axial direction of the reel base are loaded onto the reel base. Therefore, a plurality of pancake reels can be loaded onto this tape winding apparatus and the tape winding apparatus can be made comparatively small in size.

14 Claims, 32 Drawing Sheets

TAPE WINDING APPARATUS

This is a division of application Ser. No. 07/957,473, filed Oct. 7, 1992.

BACKGROUND OF THE INVENTION

1. Field of the Invention

The present invention generally relates to tape winding apparatus and, more particularly, is directed to a tape winding apparatus suitable for a so-called video cassette loader in which a copy tape is drawn out from a pancake reel around which the copy tape in which a plurality of video softwares of the same content, for example, are copied and wound and accommodated within a video cassette.

2. Description of the Prior Art

Conventional apparatus known as video cassette loaders have been proposed so far, in which a pancake reel around which a copy tape in which a plurality of video softwares of the same content are copied is loaded on a reel base, the copy tape is automatically drawn out from the pancake reel loaded onto the reel base and the copy tape of one video soft is automatically accommodated within the video cassette.

Such video cassette loaders can make 100 video cassettes, for example, from one pancake reel. The pancake reel, from which copy tapes are fully wound, is removed from the reel base of the video cassette loader in a manual fashion and a new pancake is loaded onto the reel base in a manual fashion, whereby a new video tape can be automatically wound around a video cassette according to the video cassette loader.

In order to interrupt the winding work, two video cassette loaders are generally prepared, wherein while the pancake reel is being exchanged by one video cassette loader, another video cassette loader is operated, i.e., winds the video tape.

According to the conventional technique in which two video cassette loaders are simultaneously driven as described above, the volume of magnetic tape that the video cassette loaders handle is increased. Also, the two video cassette loaders are independently driven. There is then the disadvantage such that timings at which the pancake reels are exchanged become coincident.

As a conventional technique that can solve the aforesaid problem, there has been proposed a tape winding apparatus which is described in Japanese Laid-Open Patent Publication No. 64-33783.

FIG. 1 of the accompanying drawings shows a front view of a tape winding apparatus according to the prior art.

As shown in FIG. 1, two reel bases 2, 3 are provided on the same plane within a housing 1 and pancake reels 4, 5 are respectively loaded on to the reel bases 2, 3. When this tape winding apparatus is in use, a magnetic tape 6 is taken out from any one of the pancake reels 4 and 5 and a magnetic tape 6 thus taken-out is wound around the reels of an empty cassette 7 in the directions shown by arrows A and B.

According to the conventional technique show in FIG. 1, however, since the pancake reels 4 and 5 are provided on the same plane, the volume of one winding apparatus is as a result increased comparatively so that the tape winding apparatus become difficult to operate. In addition, by the increase of the number of pancake reels then not only the size of the apparatus is increased but also the strength of the apparatus or the like must be sufficient. There is then the disadvantage that the manufacturing cost thereof is considerably increased.

Further, Japanese Laid-Open Patent Publication No. 63-83983 describes a tape automatic winding apparatus. According to this tape automatic winding apparatus, in order to splice a tape top portion at the end of the new pancake reel to a tape end of the copy tape that is wound around the preceding pancake reel side by a splicing apparatus, the tape top portion is taken out from the pancake reel to the splicing apparatus in a manual fashion.

After the tape top portion was taken out in a manual fashion, the tape top portion and the end portion of the copy tape are automatically spliced with each other, whereafter a copy tape wrapped around the new pancake reel is again wound around the empty cassette.

According to the above conventional technique, since the tape top portion of the new pancake reel is pulled out to the splicing apparatus in a manual fashion, it takes a lot of time to do such work, which as a result needs sufficient additional time for the winding work of the tape winding apparatus. Consequently, the serviceability ratio of the tape automatic winding apparatus is lowered.

FIG. 2 of the accompanying drawings shows a front view of another example of the conventional tape winding apparatus. In FIG. 2, like parts corresponding to those of FIG. 1 are marked with the same references and therefore need not be described in detail.

As shown in FIG. 2, in this tape winding apparatus, two reel bases 2,3 are provided within the housing 1. Pancake reels 4, 5 are each loaded onto the reel bases 2, 3. When this tape winding apparatus is in use, the magnetic tape 6 is taken out from any one of the pancake reels 4 and 5 and wound into the empty cassette 7 along the direction shown by an arrow a.

In this case, the start portions of the pancake reels 4, 5 and the end portions of the pancake reel are unnecessary tapes which need not be wound into the empty cassette 7 and hence they must be discarded.

To this end, in the conventional tape winding apparatus shown in FIG. 2, an excess tape winding apparatus 8 is provided, in which the winding start portion or winding end portion of the magnetic tape 6 wrapped around the pancake reel 5 and a tape end portion 10a of an excess tape 10 wrapped around a tape waste reel 9 are spliced by a splicing apparatus (not shown) and then wound around the tape waste reel 9.

According to the above conventional tape winding apparatus, since the special excess tape winding apparatus 8 is provided, a special motor that rotates the tape waste reel 9 or the like is needed, which makes the tape winding apparatus expensive and large in size.

Furthermore, the tape waste reel 9 is of an open-reel type reel so that, when the excess tape is removed from the tape waste reel 9, magnetic powders are scattered, which becomes a serious problem in work within a so-called clean room.

OBJECTS AND SUMMARY OF THE INVENTION

Therefore, it is an object of the present invention to provide an improved tape winding apparatus in which the aforesaid shortcomings and disadvantages encountered with the prior art can be eliminated.

More specifically, it is an object of the present invention to provide a tape winding apparatus into which a plurality of pancake reels can be loaded and which can be made comparatively small in size.

Another object of the present invention is to provide a tape winding apparatus in which a tape starting end portion, which is a winding end portion of a pancake reel, can be automatically drawn to a splice apparatus.

A further object of the present invention is to provide a tape winding apparatus of a simplified arrangement which can wind excess tape.

Yet a further object of the present invention is to provide a tape winding apparatus which can be made less expensively.

Yet a further object of the present invention is to provide a tape winding apparatus which can be made small in size.

Still a further object of the present invention is to provide a tape winding apparatus in which dust such as magnetic powder or the like can be prevented from being produced.

Still a further object of the present invention is to provide a tape winding apparatus in which the winding efficiency can be increased.

According to a first aspect of the present invention, there is provided a tape winding apparatus in which a tape is drawn from a pancake reel loaded onto a reel base and the tape thus drawn is wound and accommodated within a cassette. This tape winding apparatus comprises a pancake reel exchanging apparatus, wherein at least two pancake reels coaxially disposed with respect to the axial direction of the reel base are loaded onto the reel base.

According to a second aspect of the present invention, there is provided a tape winding apparatus in which a tape is drawn from a pancake reel loaded onto a reel base and the tape thus drawn is wound and accommodated within a cassette. This tape winding apparatus comprises a pancake reel exchanging apparatus, wherein the pancake reel exchanging apparatus includes an arm which can be opened and/or closed about a supporting shaft and the arm includes a pancake reel holder so that, when the arm is set in its opened state, at least one pancake reel can be loaded onto the pancake reel holder and that, when the arm is set in its closed state, at least one pancake reel is coaxially disposed relative to an axial direction of the reel base.

According to a third aspect of the present invention, there is provided a tape winding apparatus in which a tape is drawn from a pancake reel loaded onto a reel base and the tape thus drawn is wound and accommodated within a cassette. This tape winding apparatus comprises a pancake reel in which one portion of a winding end portion of a magnetic tape is temporarily bonded to the surface of the magnetic tape wrapped around an underlayer of the winding end portion by an adhesive so that the winding end portion can be prevented from becoming loose and a remaining portion of the winding end portion is employed as a free end portion serving as a tape top portion of the magnetic tape, and slackening portion forming means being moved relatively in a circumferential direction of the pancake reel to form a slackening portion in the free end portion while pushing the free end portion in a radial direction of the pancake reel, and holding means for holding the slackening portion formed by the slackening portion forming means.

In accordance with a fourth aspect of the present invention, there is provide a tape winding apparatus in which a tape is drawn from a pancake reel loaded onto a reel base and the tape thus drawn is wound and accommodated within a cassette. This tape winding apparatus comprises a pancake reel in which a tape having a different color is provided on a winding end portion of a magnetic tape. One portion of the tape having a different color is temporarily bonded to the surface of the magnetic tape wrapped around an underlayer of the winding end portion by an adhesive so that the winding end portion can be prevented from becoming loose and a remaining portion of the tape having a different color is employed as a free end portion serving as a tape top portion of the magnetic tape, and slackening portion forming means being moved relatively in a circumferential direction of the pancake reel to form a slackening portion in the free end while pushing the free end portion from a radial direction of the pancake reel, and holding means for holding the slackening portion formed by the slackening portion forming means.

In accordance with a fifth aspect of the present invention, there is provided a tape winding apparatus in which a tape is drawn from a pancake reel loaded onto a reel base and the tape thus drawn is wound and accommodated within a cassette. This tape winding apparatus comprises means for making a waste tape in the winding start and end portion of the pancake reel a waste tape, and means for winding the waste tape into a particular cassette of the cassette.

In accordance with a sixth aspect of the present invention, there is provided a tape winding apparatus in which a tape is drawn from a pancake reel loaded onto a reel base and the tape thus drawn is wound and accommodated within a cassette. This tape winding apparatus comprises means for dividing the tape thus drawn into a useful tape and a waste tape, and means serving as both tape winding means for winding the useful tape and waste tape winding means for winding the waste tape, wherein the useful tape and the waste tape are respectively wound into different cassettes.

The above and other objects, features, and advantages of the present invention will become apparent from the following detailed description of illustrative embodiments thereof when read in conjunction with the accompanying drawings, in which like reference numerals are used to identify the same or similar parts in the several views.

Figure 25:
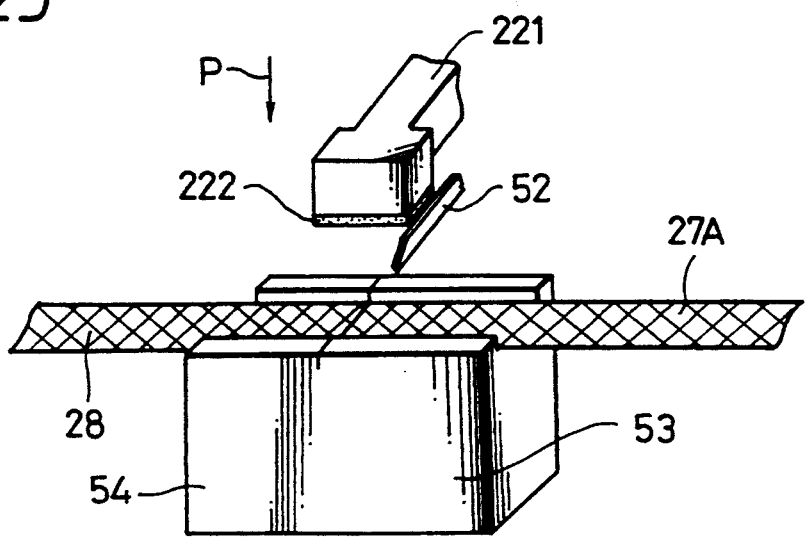
Figure 27A:
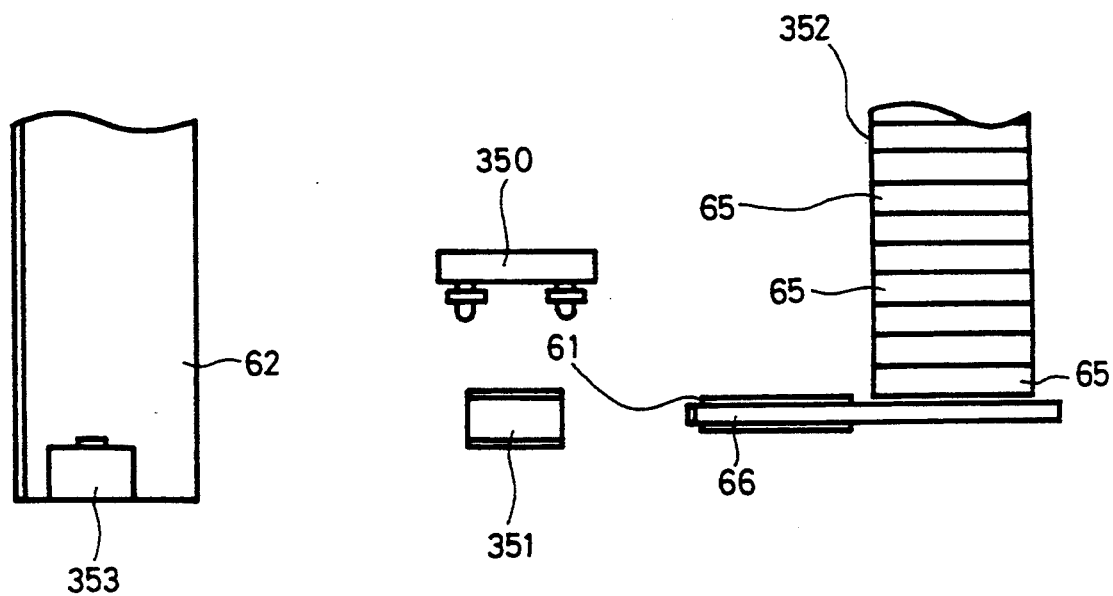
Figure 27B:
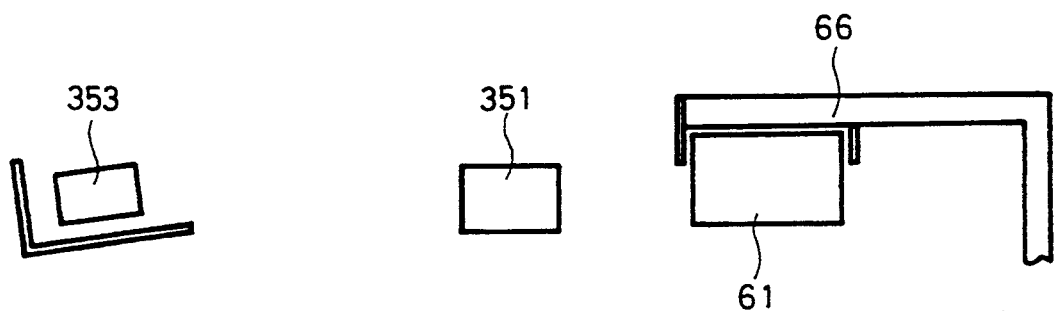
Figure 28A:
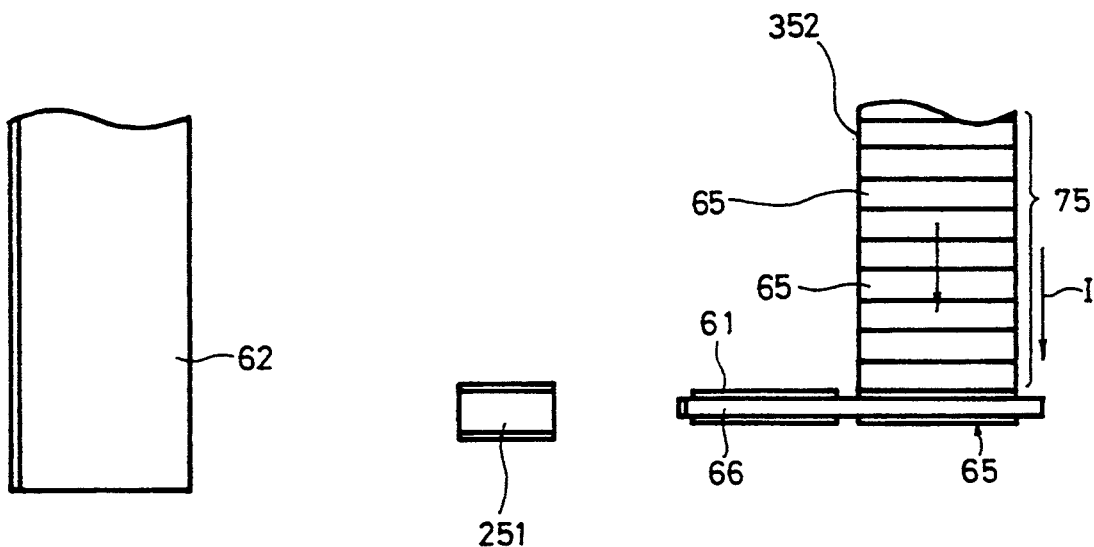
Figure 28B:
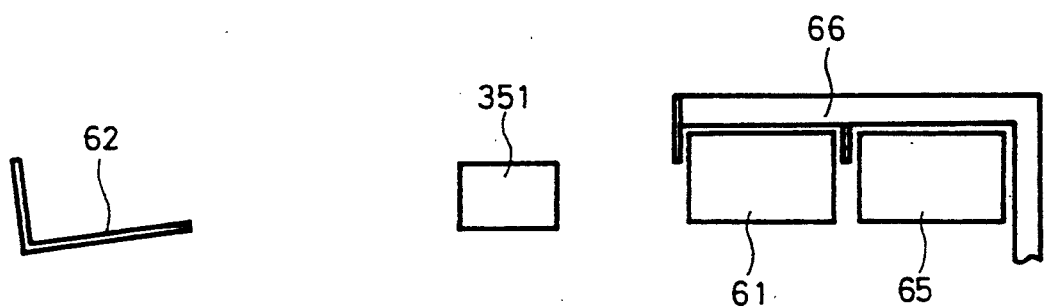
Figure 29A:
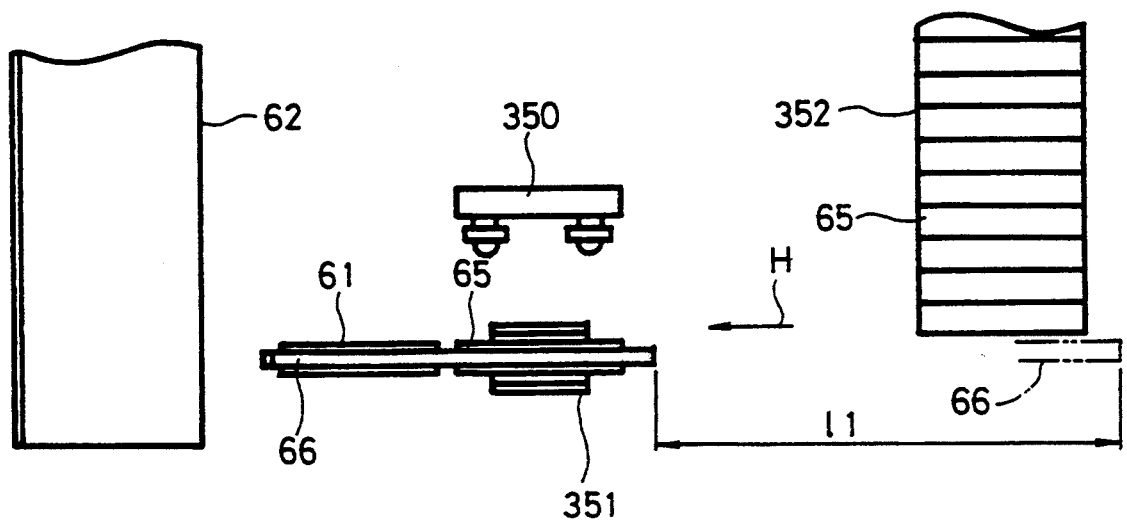
Figure 29B:
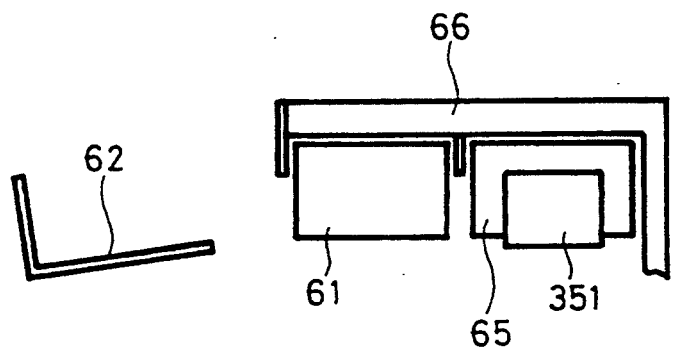
Figure 30A:
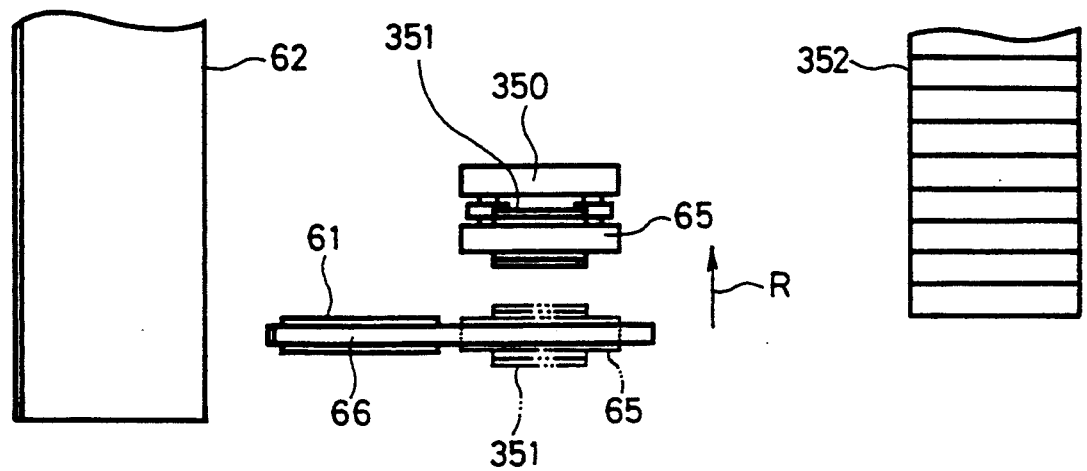
Figure 30B:
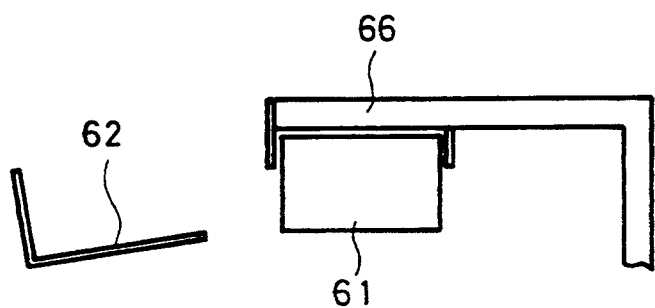
Figure 31A:
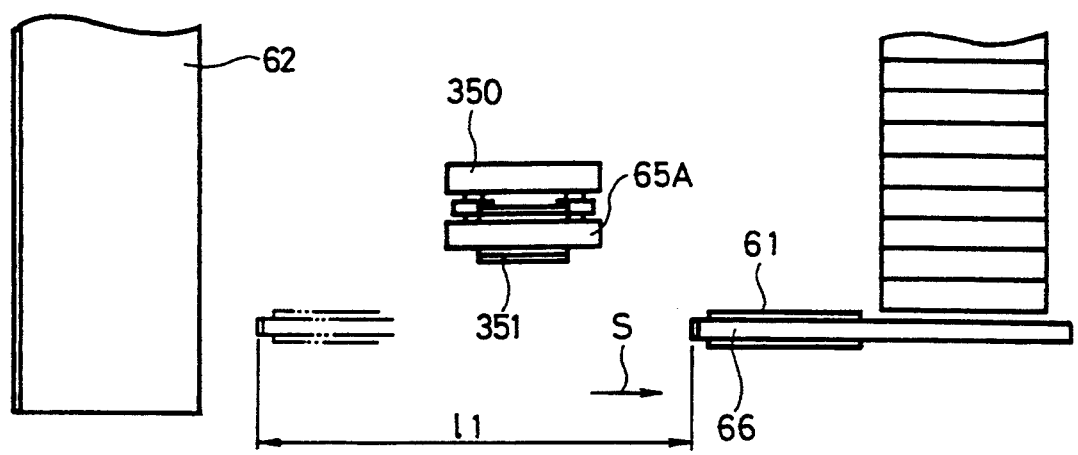
Figure 31B:
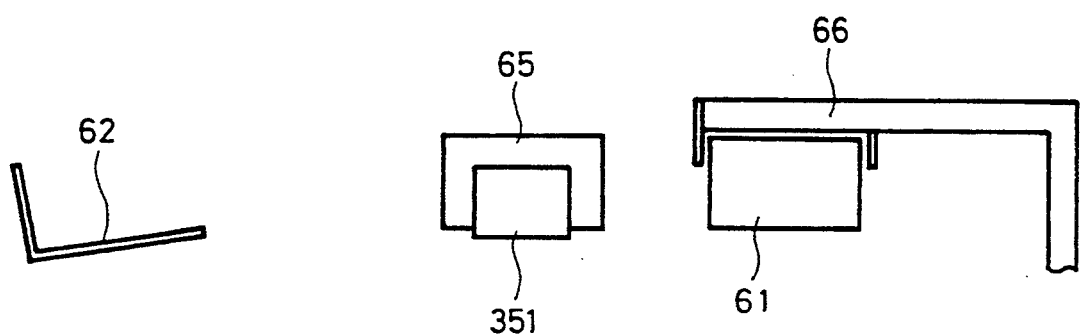
Figure 32A:
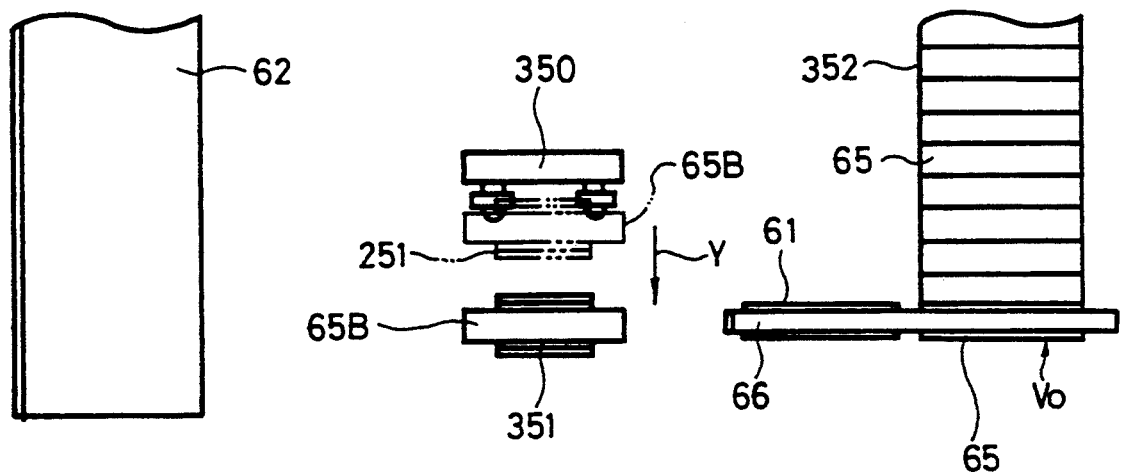
Figure 32B:
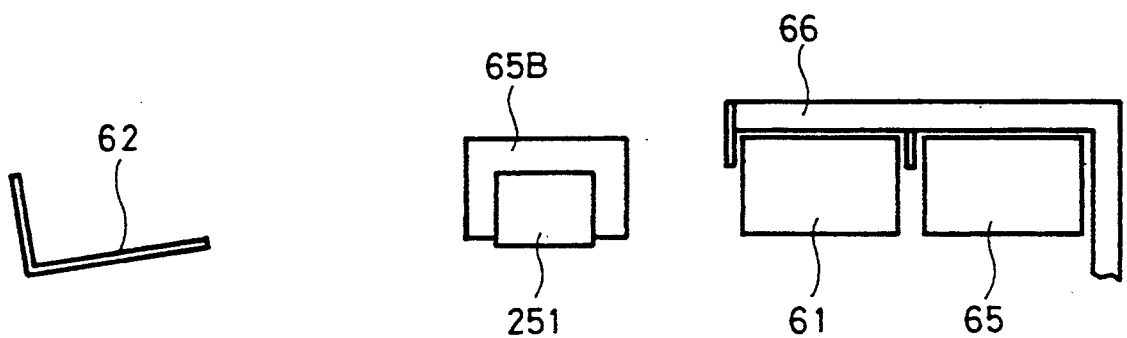
Figure 33A:
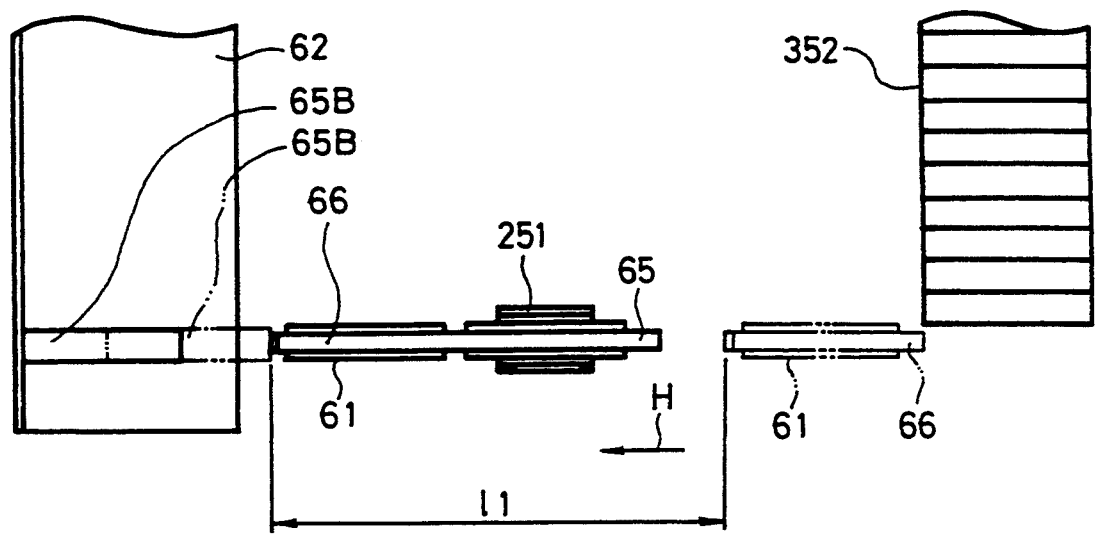
Figure 33B:
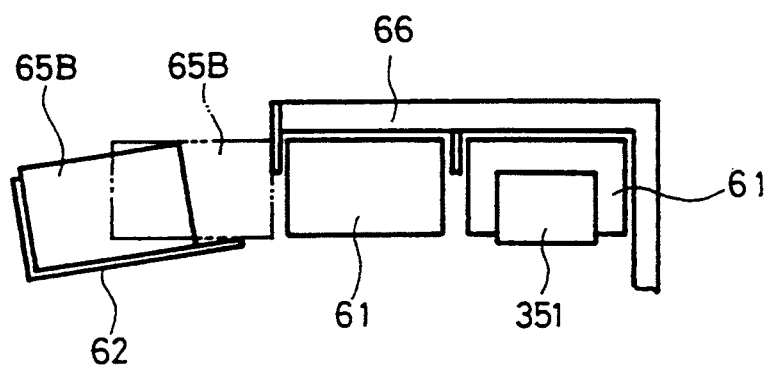
Figure 34A:
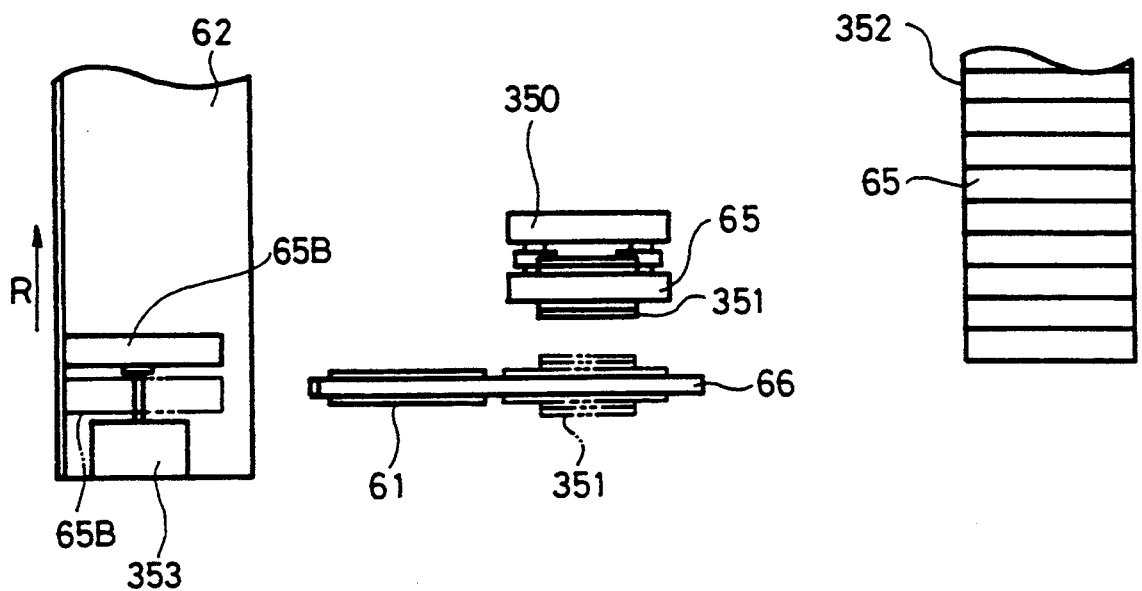
Figure 34B:
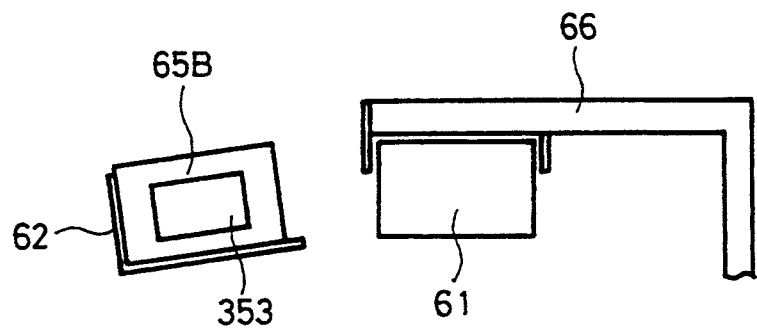
Figure 35A:
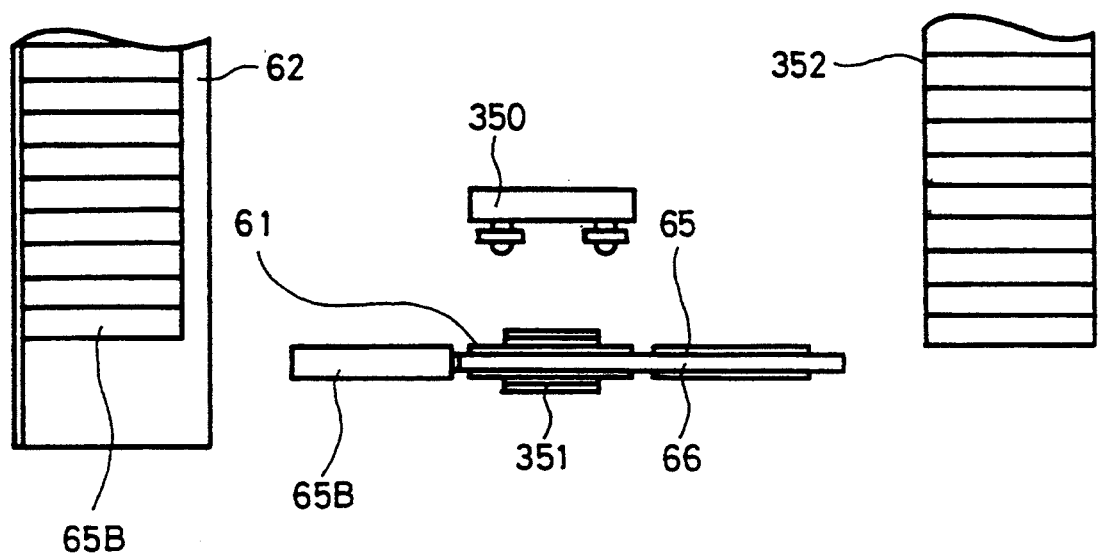
Figure 35B:
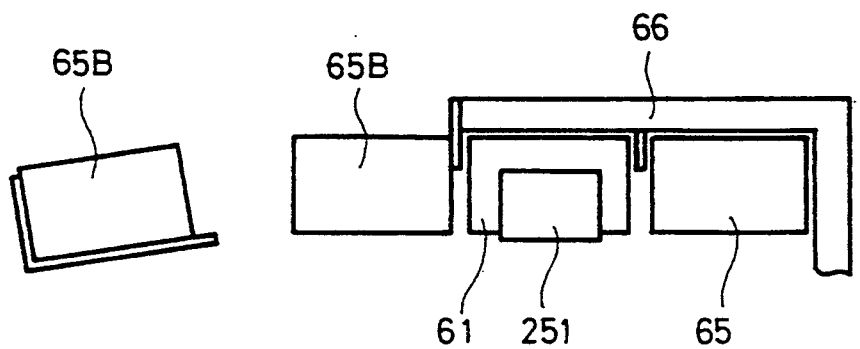
Figure 36A:
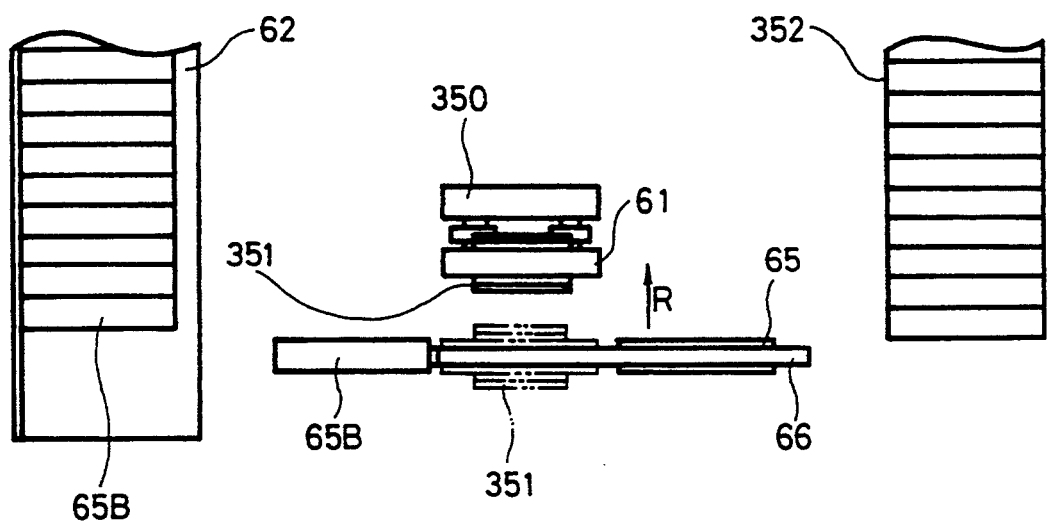
Figure 36B:
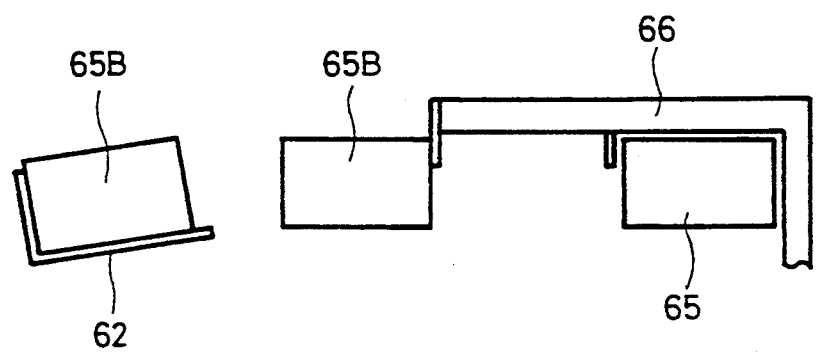
Figure 37A:
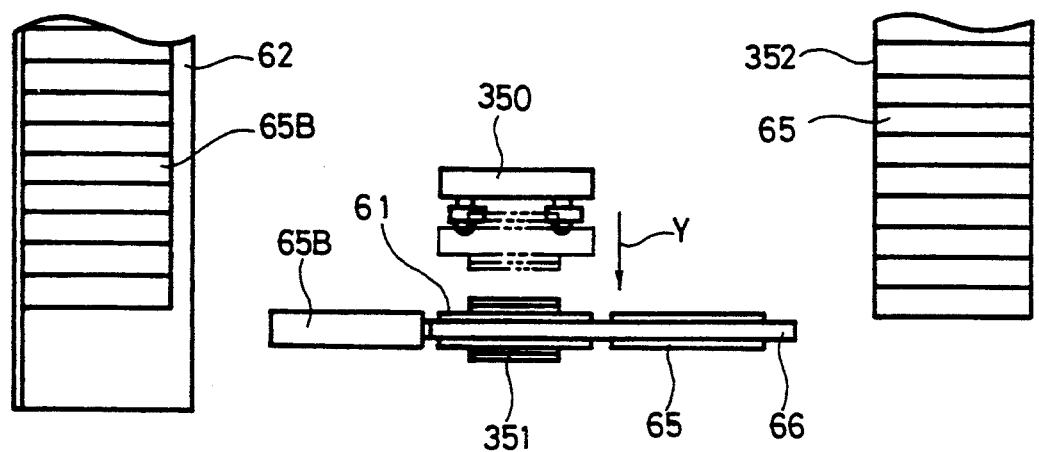
Figure 37B:
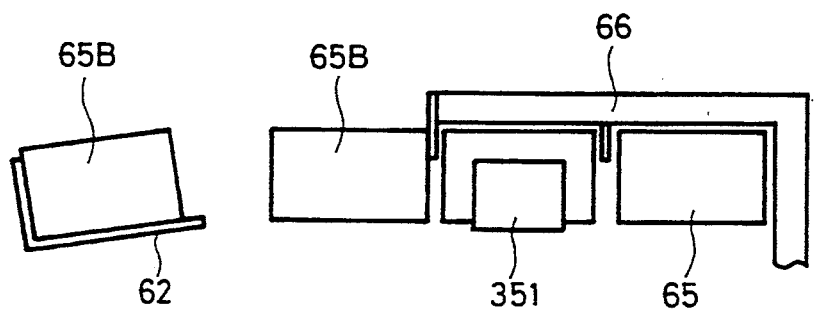

FIG, 23 is a schematic perspective view showing an overall arrangement of the tape winding apparatus according to the present invention;

FIG, 24 is a perspective view showing the condition before the tape top portion of the magnetic tape is cut;

FIG. 25 is a perspective view showing the condition after the tape top portion of the magnetic tape is cut;

FIGS. 26A through 26G are respectively diagrams used to explain operation in which a waste tape is wound into a waste tape winding cassette;

FIGS. 27A and 27B are respectively diagrams showing the condition such that operation for winding a magnetic tape into an empty cassette is just started;

FIGS. 28A and 28B are respectively diagrams showing the condition such that the first empty cassette is loaded onto a cassette moving arm;

FIGS. 29A and 29B are respectively diagrams showing the condition such that the empty cassette is loaded onto a cassette loading apparatus;

FIGS. 30A and 30B are respectively diagrams showing the condition such that an empty cassette is loaded onto a cassette winding apparatus;

FIGS. 31A and 31B are respectively diagrams showing the condition such that the magnetic tape is being wound into the empty cassette;

FIGS. 32A and 32B are respectively diagrams showing the condition such that a product cassette in which the winding of a copy tape was finished is manufactured;

FIGS. 33A and 33B are respectively diagrams showing the condition such that the product cassette in which the winding of the copy tape was finished is transported into a cassette eject tray;

FIGS. 34A and 34B are respectively diagrams showing the condition such that a new empty cassette is being loaded onto the cassette winding apparatus;

FIGS. 35A and 35B are respectively diagrams showing the condition such that the waste tape winding cassette is set in the standby mode;

FIGS. 36A and 36B are respectively diagrams showing the condition such that the waste tape winding cassette is loaded onto the tape winding apparatus; and FIGS. 37A and 37B are respectively diagrams showing the condition after the waste tape was wound into the waste tape winding cassette.

DETAILED DESCRIPTION OF THE PREFERRED EMBODIMENTS

Embodiments of the tape winding apparatus according to the present invention will now be described with reference to the drawings.

Figure 1:
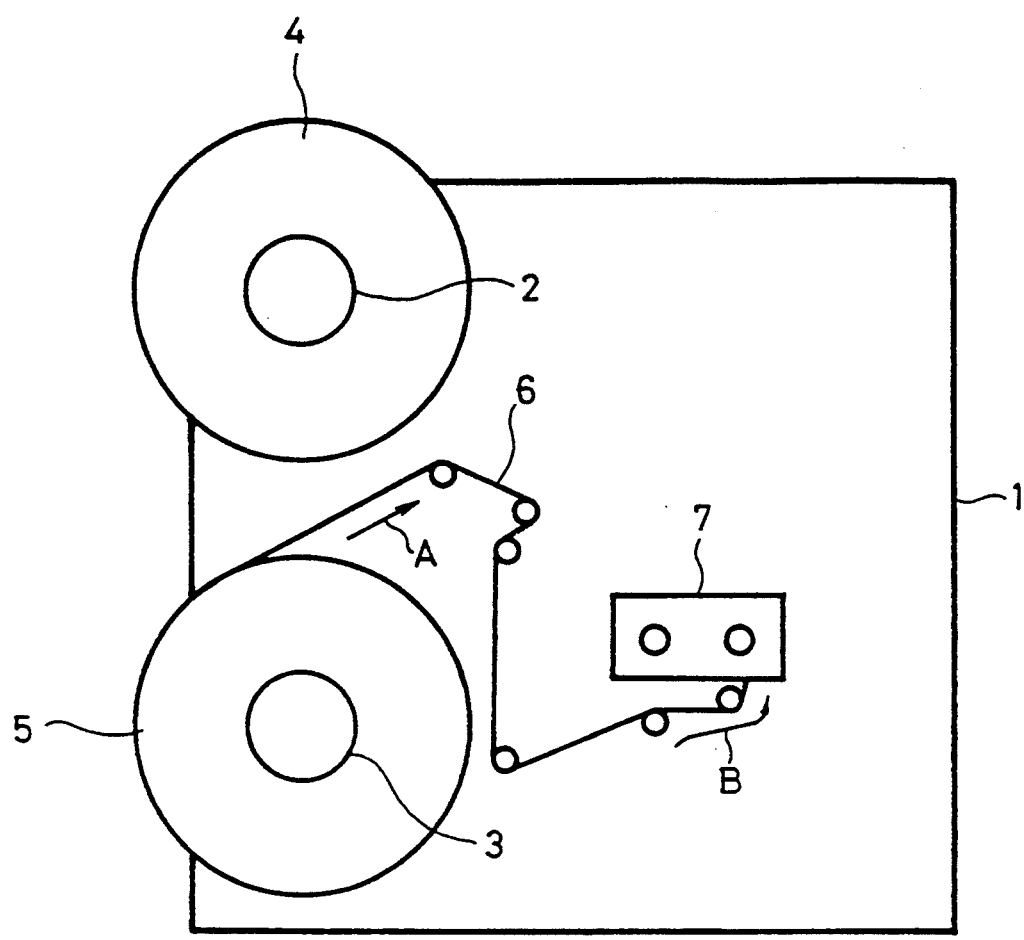
FIG. 1 is a front view showing an example of a conventional tape winding apparatus.
Figure 2:
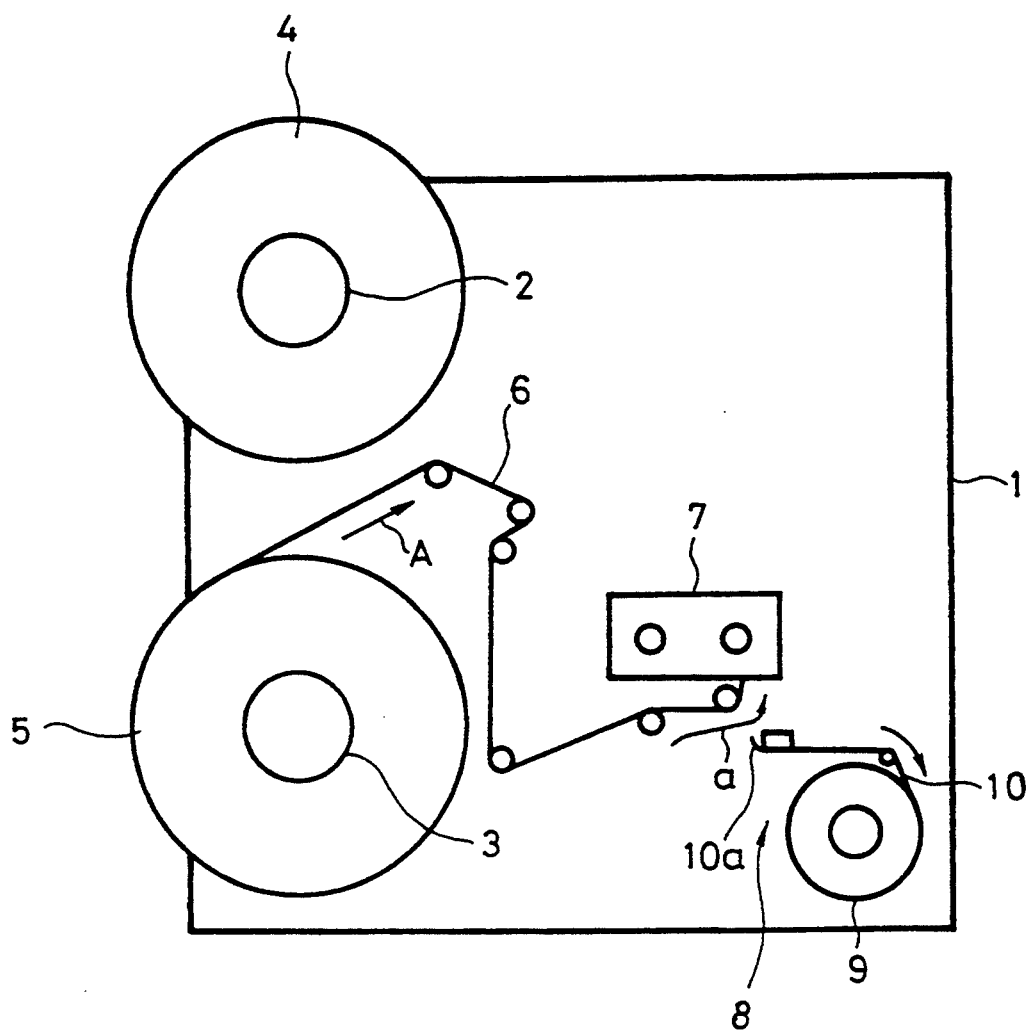
FIG. 2 is a front view showing another example of a conventional tape winding apparatus.
Figure 3:
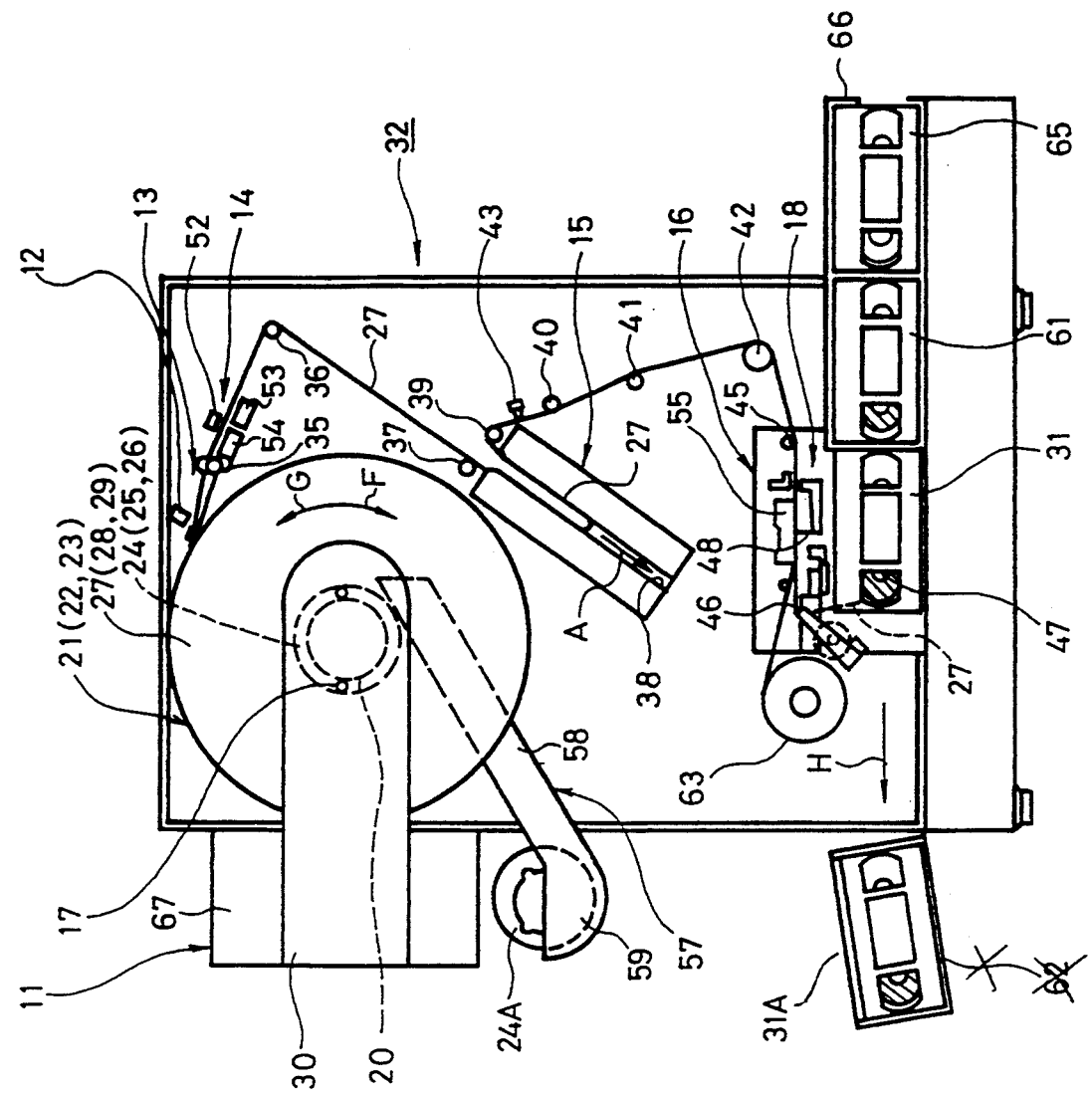
FIG. 3 is a front view showing an embodiment of a tape winding apparatus according to the present invention.

FIG. 3 of the accompanying drawings is a front view showing an arrangement of an embodiment of a tape winding apparatus according to the present invention.

Figure 4:
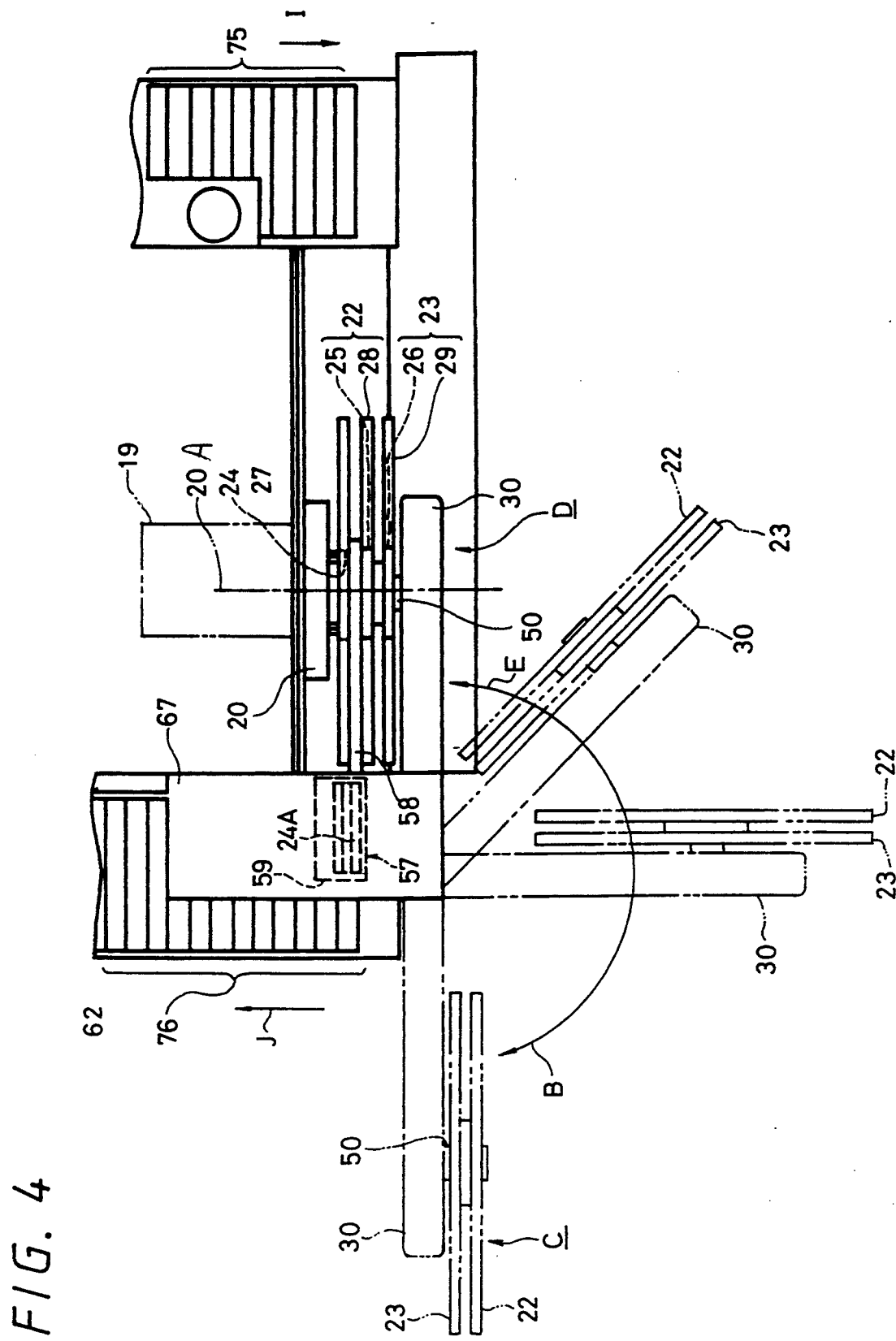
FIG. 4 is a plan view showing the tape winding apparatus of FIG. 3.

FIG. 4 of the accompanying drawings is a front view of the tape winding apparatus shown in FIG. 3.

Referring to FIGS. 3 and 4, the tape winding apparatus of this embodiment fundamentally comprises a pancake reel changing apparatus (simply referred to as "auto changer" in the description which follows) 11, a tape top detecting apparatus 12, a tape top holding and withdrawing apparatus 13, a tape second splice apparatus 14, an air trough unit 15, a tape rewind first splice apparatus 16, a waste hub removing apparatus 17 and a waste tape winding apparatus 18.

In FIGS. 3 and 4, reference numerals 21 to 23 depict pancake reels, respectively. The respective pancake reels 21 to 23 include cylindrical central hubs 24 to 26 around which there are wrapped magnetic tapes 27 to 29. A plurality of video softwares having the same content are copied in the magnetic tapes 27 to 29. The magnetic tape in which the video software is copied is known as "copy tape".

The three pancake reels 21 to 23 are attached in such a manner that their axial directions are made coaxial with an axial direction 20A of the reel base 20. In this case, only the innermost pancake reel 21 is loaded onto the reel base 20, while the remaining two pancake reels 22, 23 are loaded onto a pancake reel base 50 of an auto changer arm 30 which constructs the auto changer 11. Incidentally, the reel base 20 is secured to a rotary shaft of the reel motor 19, and the reel motor 19 is connected to a controller circuit (not shown).

Operation and more detailed arrangement of the tame winding apparatus thus arranged will be described below. When describing the operation of the tape winding apparatus, the whole operation will be described and operation of each part will be described next with reference to FIGS. 3 and 4. The arrangement of the tape winding apparatus will be described more fully as necessary.

FIG. 3 shows the condition such that the magnetic tape 27, taken out from the pancake reel 21, is being wound around an empty cassette 31. This empty cassette 31 is generally known as "V0 cassette".

The auto changer arm 30 of the first pancake reel 21 is opened in the direction shown by an arrow B in FIG. 4 and then the pancake reel 21 is loaded onto the reel base 20 at a position C that is spaced apart a home position D by an angular spacing of about 180 degrees. The opening angle of the auto changer arm is not limited thereto and may be limited to about 90 degrees or about 270 degrees. At the position C, the remaining two pancake reels 23, 22 are loaded onto the pancake holder 50 in a manual fashion.

After the two pancake reels 22, 23 were loaded on to the pancake reel holder 50, the auto changer arm 30 is closed in the direction shown by an arrow E in FIG. 4 in a manual fashion and set to a home position D. In this case, the auto changer arm 30 may be closed either in a manual fashion or automatically.

After the pancake reels 21 to 23 were set at the home position D, a so-called initial loading work is carried out in a manual fashion, in which the magnetic tape 27 is first taken out from the innermost pancake reel 21 loaded on to the reel base 20 and the magnetic tape 27 is loaded on a tape rewind apparatus body 32. This initial loading work may be carried out even when the pancake reels 22, 23 are set at the position C. As will be described later on, only the first pancake reel 21 is loaded in a manual fashion upon initial tape loading work and other pancake reels 22, 23 are automatically loaded onto the reel base 20 after the pancake reel 21 was utilized. This automatic loading operation will be described in detail later.

While the magnetic tape 27 is being wound around the cassette 31, the auto changer arm 30 may be opened to thereby properly fill pancake reels into the pancake holder 50. When the pancake reels are filled into the pancake reel holder 50, the auto changer arm 30 is opened and an angle at which the auto changer arm 30 may be set to a proper angle as earlier noted. Although the auto changer arm 30 is opened at 45 degrees, 90 degrees and 180 degrees (position C) as illustrated in FIG. 4, the auto changer arm 30 may be opened up to 270 degrees. Considering the working efficiency when the pancake is changed, it is to be appreciated that the above angle is preferably selected in a range of from about 90 degrees to about 270 degrees. When the overall arrangement of the apparatus must be made compact in size inter alia, the above angle is selected to be about 45 degrees.

The magnetic tape 27 that has been taken out from the pancake reel 21 in a manual fashion is introduced through guide rollers 35 to 37 into the air trough unit 15. While the magnetic tape 21 is being pulled out from the pancake reel 21, the pancake reel 21 is rotated in the direction shown by an arrow F in FIG. 3. The air trough unit 15 pulls the magnetic tape 27 into a trough 38 by an air suction force of a constant pressure (e.g., 100 gf) in the direction shown by an arrow A in FIG. 3.

The reason for this is to hold the magnetic tape 27 pulled from the air trough unit 15 at a constant tension.

The magnetic tape 27 pulled from the air trough unit 15 is introduced through guide rollers 39 to 41 into a counter roller 42. The counter roller 42 is adapted to control the length of the magnetic tape 27. An output of the counter roller 42 is connected to a controller circuit (not shown).

Between the guide roller 39 and the counter roller 42, there are disposed a cue head 43 that detects a cue signal recorded on the magnetic tape 27, a tape cleaner (not shown) that cleans front and back surfaces of the magnetic tape 27 by a cleaning tape (not shown), and a tape pin-hole sensor (not shown) that is formed of a photosensor or the like to detect a pin-hole on the magnetic tape 27. Alternatively, the tape pin-hole sensor may be replaced with a tape existence and absence sensor (not shown) or the like. The cue head 43, the tape cleaner and the tape pin-hole sensor are connected to the above-mentioned controller circuit (not shown).

The magnetic tape 27 from the counter roller 42 travels through a magnetic tape guide roller 45 and a leader tape guide roller 46 constructing the tape rewind and first splice apparatus 16 and wound into the cassette 31. A leader tape is accommodated in advance within the cassette 31 so that, when a magnetic tape winding reel motor 47 is rotated after one end of the leader tape was bonded to the tape top of the magnetic tape 27, the winding operation of the magnetic tape 27 into the cassette 31 is started. When being wound into the cassette 31, the magnetic tape 27 is generally wound at a speed of 10 to 15 m/second.

The length of the magnetic tape 27 wound into the cassette 31 is controlled by an output signal from the counter roller 42. After the magnetic tape 27 whose length has been controlled on the basis of the output signal from the counter roller 42 was wound into the cassette 31, the revolution of the reel motor 47 is stopped and the magnetic tape 27 is cut by a cutter 48 that constructs the tape rewind and first splice apparatus 16.

After the trailing end of the leader tape was bonded to the magnetic tape 27 thus cut, the winding of the magnetic tape 27 into the cassette 31 is finished.

A now leading near end the guide roller 45 side in FIG. 3) of the magnetic tape 27 is attracted to and held on an attracting block 55 that constructs the tape rewind and first splice apparatus 16.

When the copied video software is fully unwound from the magnetic tape 27 wrapped around the pancake reel 21, the magnetic tape 27 on the upstream side of the magnetic tape 27 attracted to and held by the attracting block 55 that constructs the tape rewind and first splice apparatus 16 is cut by a cutter 52 constructing the tape and second splice apparatus 14. The respective cut portions of the magnetic tape 27 by the cutter 52 are respectively attracted by attracting blocks 53 and 54. In this state, the magnetic tape 27 extended between the attracting block 53 and the attracting block 55 disposed within the tape rewind and first splice apparatus 16 is referred to as a waste tape 27A.

Then, when the reel base 20 is rotated in the direction shown by an arrow G in FIG. 3, the magnetic tape 27 on the pancake reel 21 side is detached from the attracting block 54 and then wound around the reel hub 24.

This reel hub 24 (hereinafter referred to as a waste reel hub 24A) is automatically detached from the reel base 20 as will be described later on. The waste reel hub 24A that was detached from the reel base 20 travels through an inclined conduit portion 58 of a channel-configuration that constructs a reel hub recollecting apparatus 57 and stored in a hub accommodating portion 59.

When a cassette (hereinafter simply referred to as a waste tape winding cassette) that is used to wind the waste tape 27A is automatically transported by operation of a cassette moving arm 66 in the direction shown by an arrow H in FIG. 3, the cassette 31 into which the copy tape was wound also is automatically transported in the direction shown by the arrow H in FIG. 3 and hence accommodated within a cassette storage tray (FIG. 4) as a product cassette 31A (cassette 31 in which the copy tape was wound).

When the waste tape winding cassette 61 is set at the position of the tape rewind and first splice apparatus 16, the leader tape is pulled out from the waste tape winding cassette 61. Then, the leader tape and the end portion of the waste tape 27A, attracted by the tape attracting block 55, are spliced by utilizing a splice tape 63.

On the other hand, the next new pancake reel 22 that is loaded onto the pancake reel holder 50 of the auto changer arm 30 is automatically loaded on to and fixed to the reel base 20 as will be described later on.

At that time, since a bar code or the like is formed on the tape top leading edge of a magnetic tape 28 wrapped around the pancake reel 2, the tape top of the magnetic tape 28 is brought into the position of the tape top holding and withdrawing apparatus 13 by the rotation of the reel motor 19 that rotates the reel base 20 and the operation of the tape top position detecting apparatus 12.

Thereafter, the tape top of the magnetic tape that is wrapped around the pancake reel 22 is taken out to the attracting block 54 of the tape and second splice apparatus 14 by the tape top holding and withdrawing apparatus 13. Then, the tape top of the magnetic tape 28 is attracted and held by the attracting block 54.

Under this condition, the tape top of the magnetic tape 28 that has been attracted and held by the attracting block 54 is spliced to the tape end of the waste trailing 27A that has been attracted and held by the attracting block 23 by the tape and second splice apparatus 14. By this splicing operation, a leader tape within the waste tape winding cassette 61 and the magnetic tape 28 of the new pancake reel 22 are spliced as one tape.

Therefore, by rotating the reel motor 47 on the waste tape winding cassette 61 side, the waste tape 27A, which does not need to be wound into the next empty cassette 65 serving as the V0 cassette, can be wound into the waste tape winding cassette 61.

After the waste tape 27A was wound into the waste tape winding cassette 61, the empty cassette 65 is automatically transported to the position of the tape rewind and first splice apparatus 16. At that position, the leader tape in the empty cassette 65 and the magnetic tape 28 are spliced and the winding operation of the magnetic tape 28 into the empty cassette 65 is started.

In this case, the waste tape winding cassette 61 is returned to the position shown in FIG. 3.

When the pancake is not exchanged, a magnetic tape of a predetermined length is wound into the cassette and then the cassette is discharged by a cassette moving arm 66 into the cassette storage tray 62. At that very moment, a new empty cassette is brought into the position of the tape rewind and first splice apparatus 16.

In FIG. 4, a cassette group 75 is a cassette group which is transported in the direction shown by an arrow I in FIG. 4 and set at the position of the cassette 65 shown in FIG. 3. Also, a cassette group 76 is a cassette group serving as a product stored in the cassette storage tray 62 and in which the copy tapes are wound. The product cassette 31A shown in FIG. 3 is sequentially transported in the direction shown by an arrow J in FIG. 4.

The whole operation of the tape winding apparatus according to the embodiment of the present invention has been described so far. Operation of each part of this tape winding apparatus will be described below.

As shown in FIG. 4, when the pancake reel is loaded, the auto changer arm 30 is opened at a predetermined angle, while when the magnetic tape is wound from the pancake reel into the cassette, the auto changer arm 30 is closed in principle.

Figure 5A:
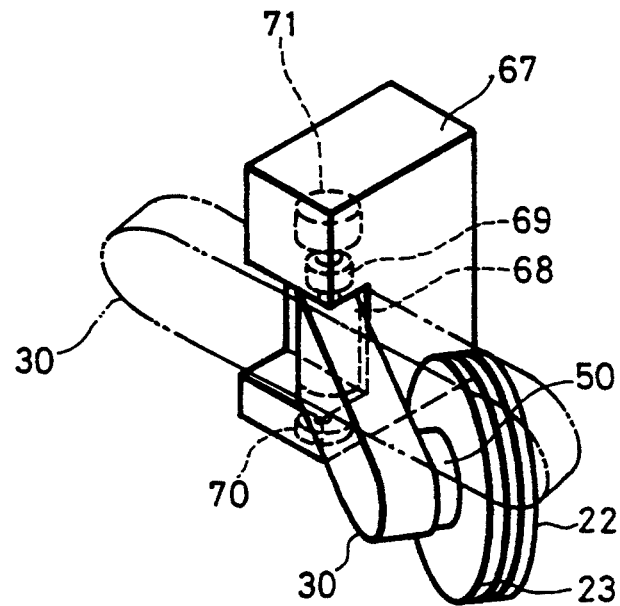
FIG. 5A is a perspective view showing the state such that the auto changer arm is being opened and/or closed.
Figure 5B:
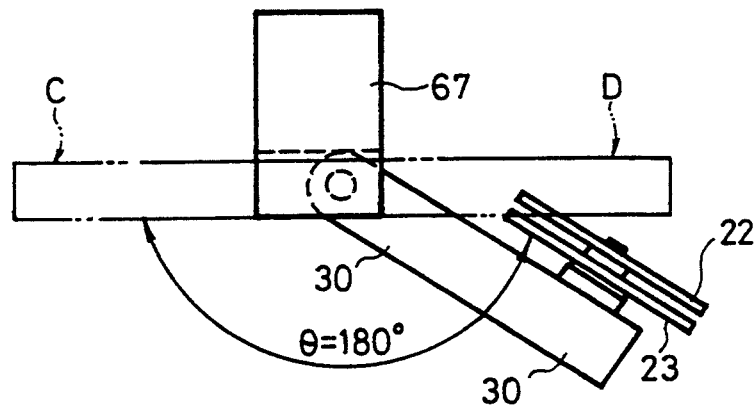
FIG. 5B is a plan view showing the state such that the auto changer arm is in its closed state.
Figure 5C:
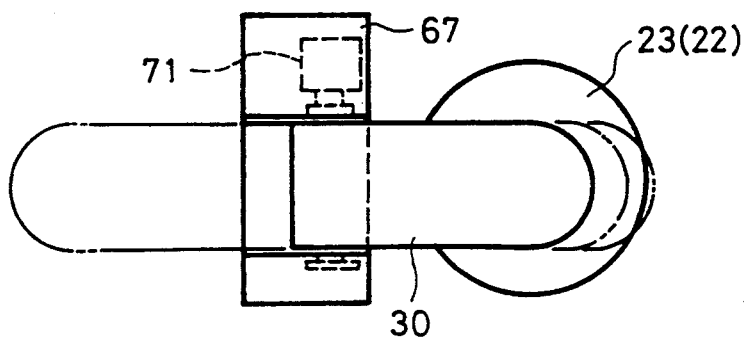
FIG. 5C is a front view showing the state such that the auto changer arm is in its opened state.

FIGS. 5A, 5B and 5C of the accompanying drawings are respectively perspective, plan and front views showing the states such that the auto changer arm 30 is being opened and/or closed, set in its closed state and set in its opened state.

As shown in FIGS. 5A to 5C, one end of the auto changer arm 30 is attached to a shaft 68 serving as a support shaft of a body 67 of the auto changer 11. A pancake reel holder 50 is attached to the other end of the auto changer arm 30 and the pancake reels 23, 22 are loaded onto the pancake reel holder 50.

The respective ends of the auto changer arm 30 are supported to and secured to bearings 6g, 70 fixed to the body 67. The bearing 69 is attached to an air cylinder 71 that is formed of a rotary actuator as a driver unit. The air cylinder 71 is communicated by means of two paths (not shown) to an air pressure source (not shown) that is under the control of the above control circuit. When an air is supplied to any one of the two paths, the air cylinder 71 operates to set the auto changer arm 30 in its closed state (home position D). Whereas, when the air is supplied to the other path, the air cylinder 71 operates to set the auto changer arm 30 in its opened state (position C). According to this embodiment, an angle $\theta$ at which the auto changer arm 30 is opened is selected to be 180 degrees (see FIGS. 4 and 5B).

The opening and/or closing operation of the auto changer arm 30 is effected by the air cylinder 71 and the bearings 69, 70 Therefore, the auto changer arm 30 can be opened and/or closed smoothly. Even when the auto changer arm 30 is repeatedly opened and/or closed, the auto changer arm 30 can be opened and/or closed with high accuracy.

Operation in which the pancake 22 or the like loaded onto the auto changer arm 30 side is automatically loaded onto the reel base 20 will be described below.

Figure 6:
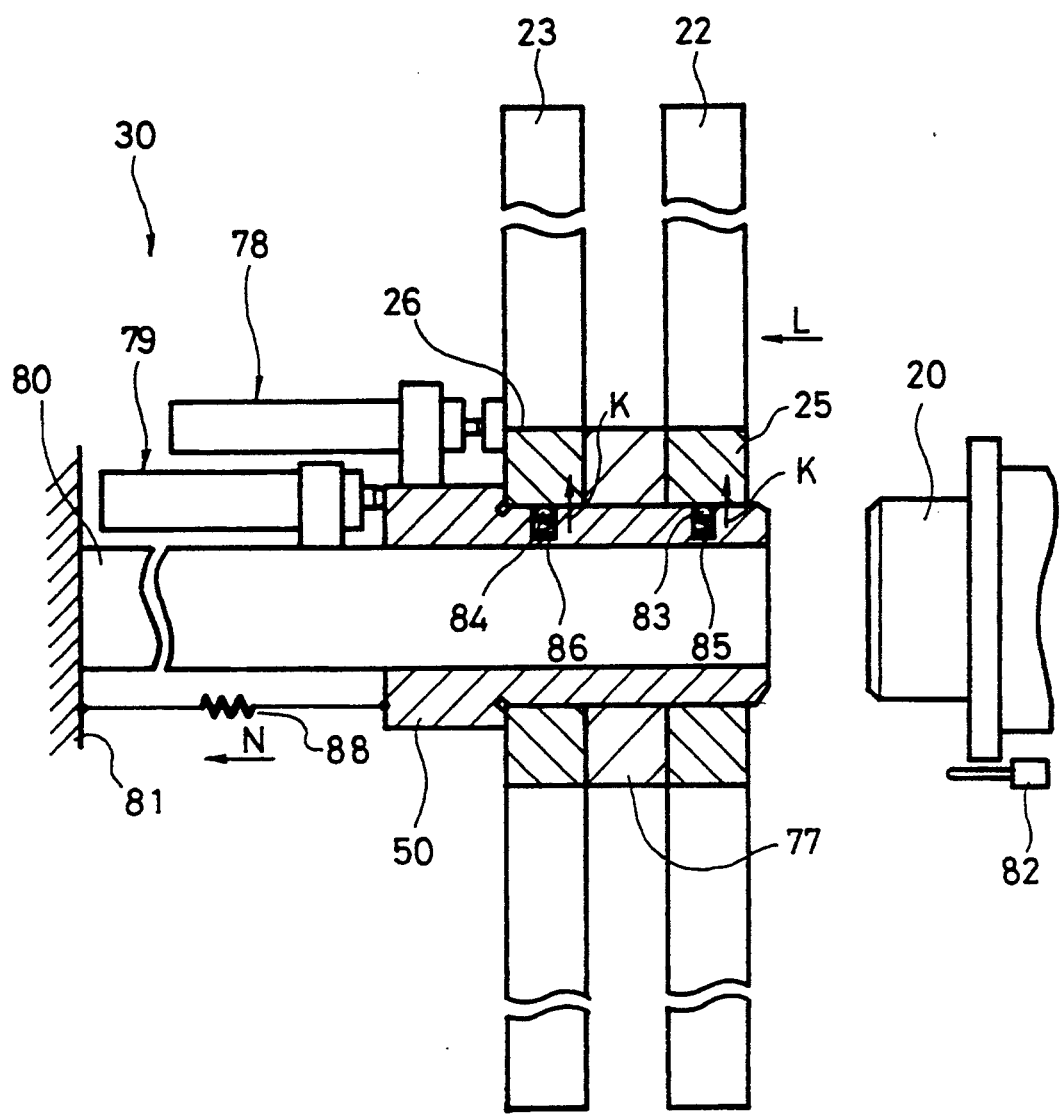
FIG. 6 is a fragmentary cross-sectional view showing the state that the auto changer arm shown in FIGS. 5A through 5C is set in its closed state.

FIG. 6 of the accompanying drawings shows the state such that the auto changer arm is set in the closed state (set at the home position D). As shown in FIG. 6, air cylinders 78, 79 and a shaft 80 along which the pancake reel holder 50 is slid are formed as one body with the auto changer arm 30. The shaft 80 is secured to a mount 81 of the auto changer arm 30. In the vicinity of the reel base 20 that is brought in the coaxial state with the pancake reel holder 50 under the condition such that the auto changer arm 30 is closed, there is disposed a micro-switch 82 which is served as a detector for detecting whether or not the pancake reel 22 or the like is loaded onto the reel base 20.

Support pins 83, 84 which support the pancake reel 22 or the like are provided on the pancake reel holder 50. The support pins 83, 84 are spring-biased by compression coil springs 85, 86 in the direction shown by an arrow K in FIG. 6. Owing to the spring force of the support pins 83, 84 in the direction shown by the arrow K, the pancake reels 22, 23 can be held on the pancake reel holder 50 so as not to move therefrom when the auto changer arm 30 is rotated by the opening angle $\theta$ of 180 degrees (see FIG. 5B). The support pins 83, 84 are disposed on the outer periphery of the pancake reel holder 50 at its three positions of 120 degrees each, whereby the pancake reels 22, 23 can be accurately centered on the pancake reel holder 50.

The pancakes are loaded onto the pancake reel holder 50 in a manual fashion in the sequential order of the pancake reel 23, a cylindrical spacer 77 and the pancake reel 22 from the direction shown by an arrow L in FIG. 6. When the pancake reels 22, 23 and the cylindrical spacer 77 are loaded onto the pancake reel holder 50, the inner peripheral portions of the reel hub 26, the spacer 77 and the reel hub 25 are urged against these pins 83, 84 so that these pins 83, 84 are downwardly moved, thereby shrinking these compression coil springs 85, 86. Therefore, the pancake reels 22, 23 and the spacer 77 can be smoothly loaded onto the pancake reel holder 50. Using the cylindrical spacer 77, a reel hub from which the pancake reel was removed can be utilized without modification.

Referring to FIG. 6, since the pancake reel holder 50 is spring-biased by a tension spring 88 in the direction shown by an arrow N (toward the mount 81 side) in FIG. 6, the pancake reel holder 50 can be prevented from being slipped off from the shaft 80 in the direction opposite to the arrow N direction.

Figure 7:
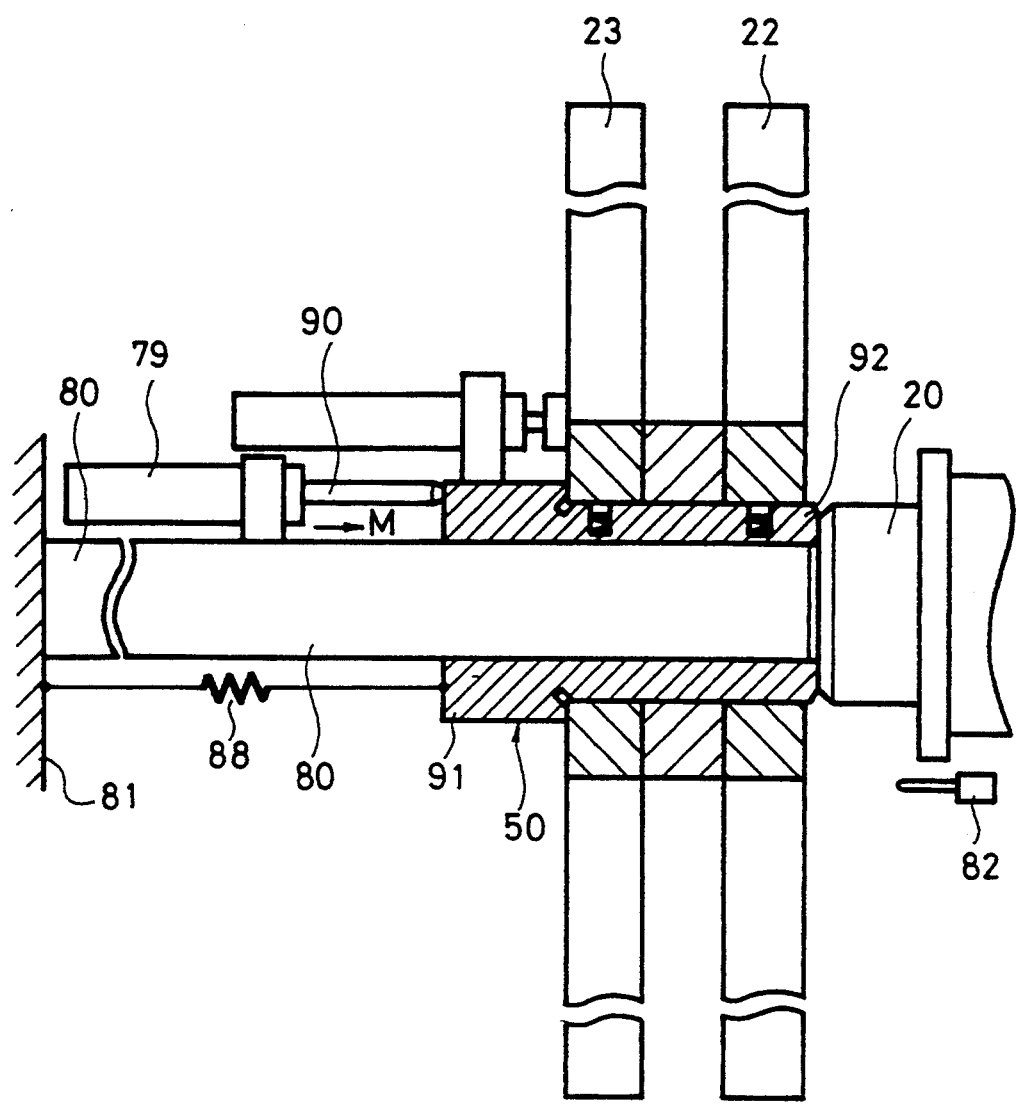
FIG. 7 is a fragmentary cross-sectional view showing the condition such that the loading of the pancake reel onto the reel base is being started.

FIG. 7 of the accompanying drawings shows the loading start condition wherein the pancake reel 22 is being loaded onto the reel base 20.

A rod 90 of the air cylinder 79 is slid in the direction shown by an arrow M in FIG. 7 from the condition shown in FIG. 6, whereby a flange portion 91 of the pancake reel holder 50 on which the pancake reels 22, 23 are held is pushed in the direction shown by the arrow M, thereby causing an inner peripheral surface of a cylindrical portion 92 of the pancake reel holder 50 to slide on the shaft 80 and then halted just before the end face of the cylindrical portion 92 of the pancake reel holder 50 confronts the front surface of the reel base 20.

Figure 8:
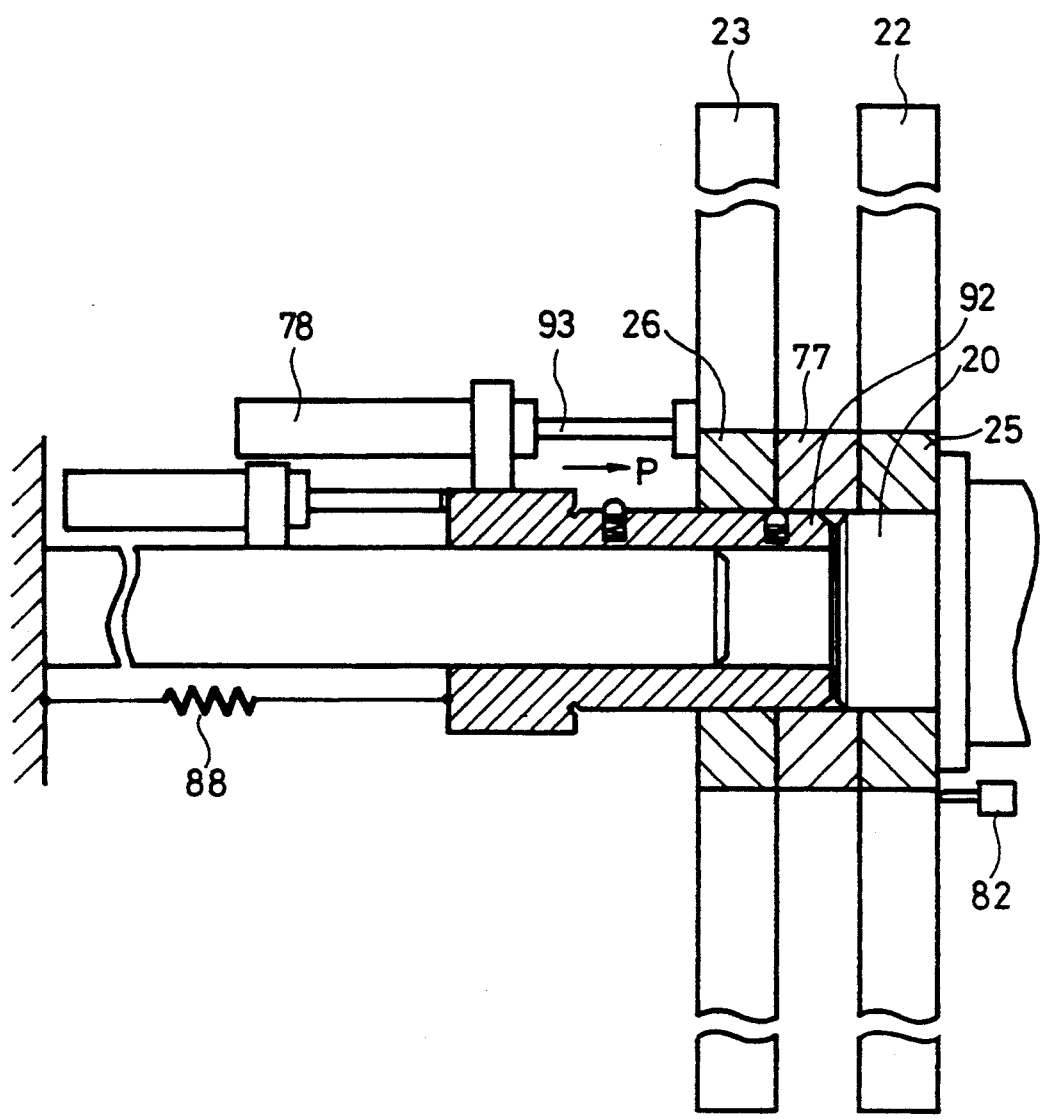
FIG. 8 is a fragmentary cross-sectional view showing the condition such that the pancake reel is being loaded onto the reel base.

FIG. 8 of the accompanying drawings shows the condition such that the pancake reel is being loaded onto the reel base.

A rod 93 of the air cylinder 78 is slid in the direction shown by an arrow P in FIG. 8 from the state shown in FIG. 7, whereby the pancake reels 22, 23 and the spacer 77 are pushed in the arrow P direction and slid on the cylindrical portion 92 of the pancake reel holder 50. Thus, the reel hub 25 of the pancake reel 22 and a part of the spacer 77 are brought in contact with the columnar side surface of the reel base 20.

Then, when a part of the pancake reel 22 confronts a micro-switch 82 when the rod 93 is being moved in the direction shown by the arrow P in FIG. 8, the movement of the rod 93 is stopped under the condition such that it pushes the pancake reel 23 in the arrow P direction. At the stopped position thereof, the rod 93 is held in the condition such that it is pushing the pancake reel 23. In this case, the rod 93 can be prevented from being withdrawn in the direction opposite to the arrow P direction.

Figure 9:
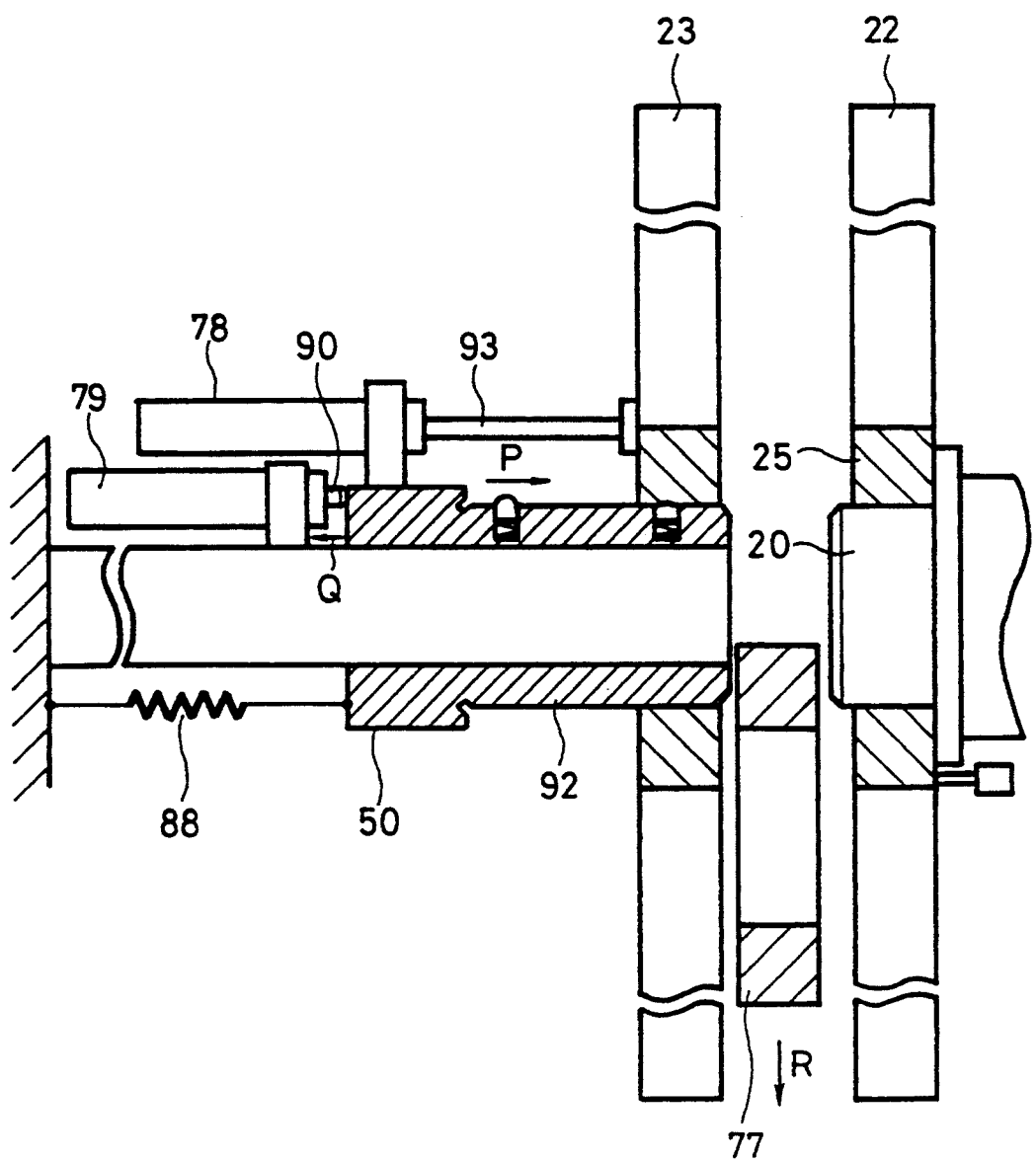
FIG. 9 is a fragmentary cross-sectional view showing the condition such that the pancake reel is loaded onto the reel base and the spacer is ejected.

As shown in FIG. 9 of the accompanying drawings, when the rod 90 of the air cylinder 79 is pulled in the direction shown by an arrow Q in FIG. 9, the pancake reel holder 50 is returned by the spring force of the tension spring 88 to the illustrated position in the arrow Q direction. At that time, when the rod 93 of the air cylinder 79 is further moved to the illustrated position in the arrow P direction, then the pancake reel 23 is pushed to the position of the end face of the cylindrical portion 92 of the pancake reel holder 50, whereby the spacer 77 is pushed from the pancake reel holder 50 and dropped freely in the direction shown by an arrow R.

The spacer 77 thus freely dropped is recollected into the hub accommodating unit 59 through the conduit portion 58 (see FIG. 3).

After the pancake reel 22 was utilized, the reel hub 25 is ejected from the reel base 20 to the reel hub recollecting apparatus 57. This eject operation will be described more fully later on. When the next pancake reel 23 is loaded onto the reel base 20 after the reel hub 25 was ejected into the reel hub recollecting apparatus 57, the pancake reel holder 50 is moved in the arrow P direction by the rod 90 of the air cylinder 79, whereby the pancake reel 23 is move near the reel base 20. Then, the rod 93 of the air cylinder 78 is moved in the arrow P direction, thereby automatically loading the next pancake reel onto the reel base 20.

After the next pancake reel was loaded onto the reel base 20, by opening the auto changer arm 30, one or two new pancake reels can be loaded onto the pancake reel holder 50 in a manual fashion.

Figure 10:
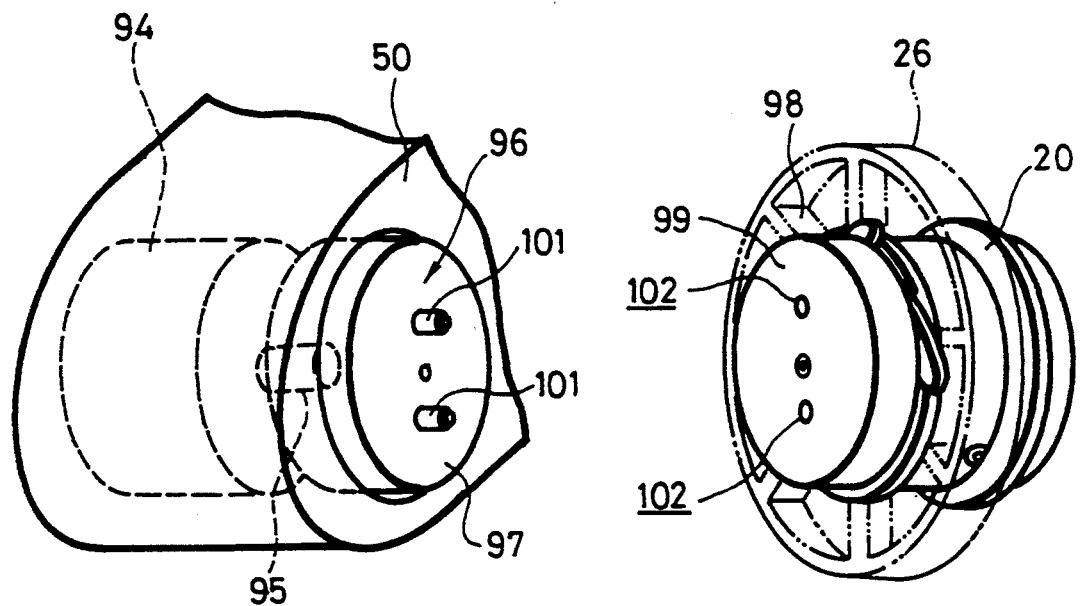
FIG. 10 is a partly-exploded perspective view showing an example of an arrangement of a hub clamping apparatus used in the present invention.

FIG. 10 of the accompanying drawings shows the condition such that the pancake reel (pancake reel 23 in this example) is fixed onto the reel base 20 that functions also as a pancake reel fixing apparatus. The reel base 20 may be a conventional reel base.

As shown in FIG. 10, a geared motor 94 is coaxially disposed on the shaft 80 (see FIG. 6, etc.) on which the pancake reel holder 50 is slid. A clamp shaft 96 is attached to a rotary shaft 95 of the geared motor 94. The clamp shaft 96 constructs a top portion (end portion facing the reel base 20) of the shaft 80.

Figure 11:
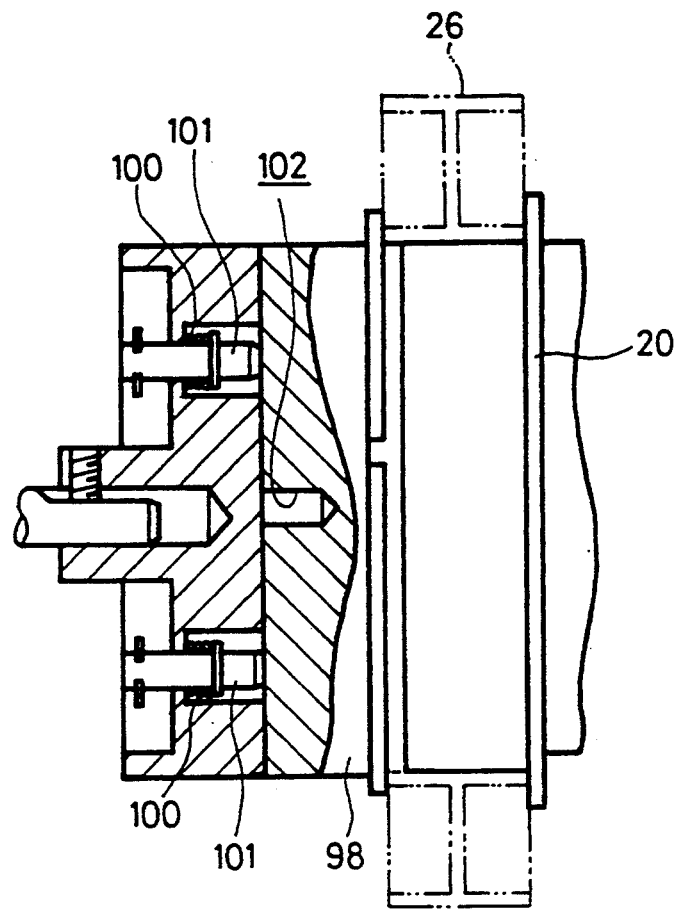
FIG. 11 is a fragmentary cross-section side view used to explain operation of the hub clamping apparatus.
Figure 12:
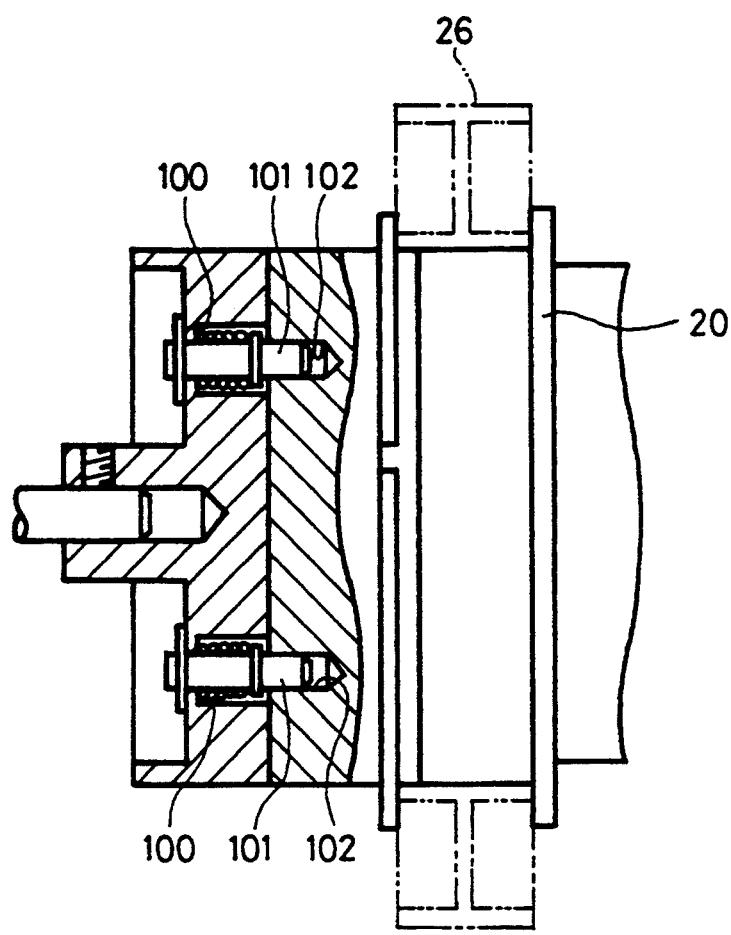
FIG. 12 is a fragmentary cross-section side view used to explain operation of the hub clamping apparatus.

FIGS. 11 and 12 of the accompanying drawings show a part of the inside structure of the clamp shaft 96 and a part of the inside structure of the reel base 20 and a knob 98.

As shown in FIGS. 10 through 12, the clamp shaft 96 has on its top surface 97 disposed pins 101, 101 which can be moved back and forth in the direction of the reel base 20 due to a relationship between compression coil springs 100, 100 and a top surface 99 of the knob 98 of the reel base 20.

When these pins 101, 101 are entered into holes 102, 102 bored through the top surface 99 of the knob 98 of the reel base 20, a turning force of the clamp shaft 96 is transmitted to the reel base 20.

When the pins 101, 101 are not coincident with the holes 102, 102, as shown in FIG. 11, the clamp shaft 96 is rotated while it is being slid on the top surface 99 of the knob 98 under the condition such that the pins 101, 101 are withdrawn by a pressure (under the condition such that the compression coil springs 100, 100 also are withdrawn by a pressure). When the clamp shaft 96 is slidably rotated to urge the pins 101, 101 and the holes 102, 102 to become coincident with each other, the pins 101, 101 are entered into the holes 102, 102 by the repulsive forces of the compression coil springs 100, 100 (condition shown in FIG. 12).

Under the condition shown in FIG. 12, a clamping mechanism of the reel base 20 can be opened and/or closed by driving the geared motor 94 (see FIG. 10).

Figure 13:
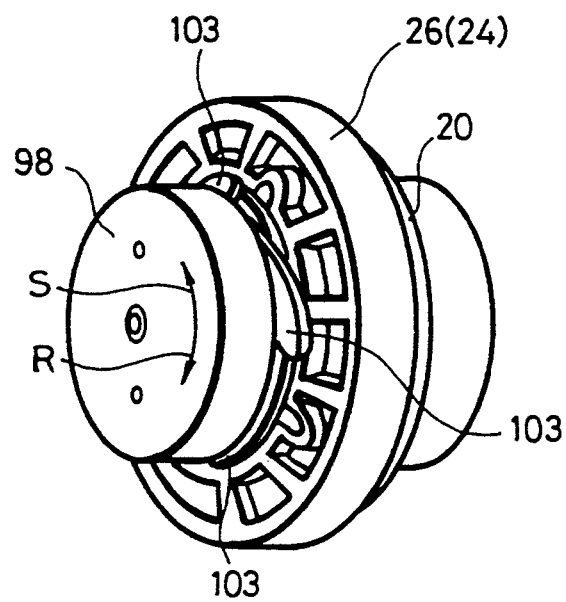
FIG. 13 is a perspective view showing the state such that the hub is clamped to the reel base.

That is, as shown in FIG. 13 of the accompanying drawings, when the knob 98 is rotated in the direction shown by an arrow R (in the clockwise direction), nail members 103, 103, 103 are opened so that the reel hub 26 of the pancake reel 23, for example, can be secured to the reel base 20. When the knob 98 is rotated in the direction shown by an arrow S (in the counter-clockwise direction), the nail members 103, 103, 103 are closed so that the reel hub 26 can be released from the reel base 20.

The eject apparatus (waste hub ejecting apparatus 17) of the reel hub 26 (the reel hub 26 will hereinafter be described as the reel hub 24 in connection with FIG. 3) under the condition such that the magnetic tape 29 is wound into the cassette 31 and no magnetic tape is left therein as shown in FIG. 13 and operation of the hub recollecting apparatus 57 will be described below. Although the magnetic tape 29 is wound into the cassette 31 and no magnetic tape is left as described above, it is frequently observed that the magnetic tape of about 2 to 3 meters is wound around the hub 24 and is not fully wound into the cassette 31 in actual practice.

Figure 14:
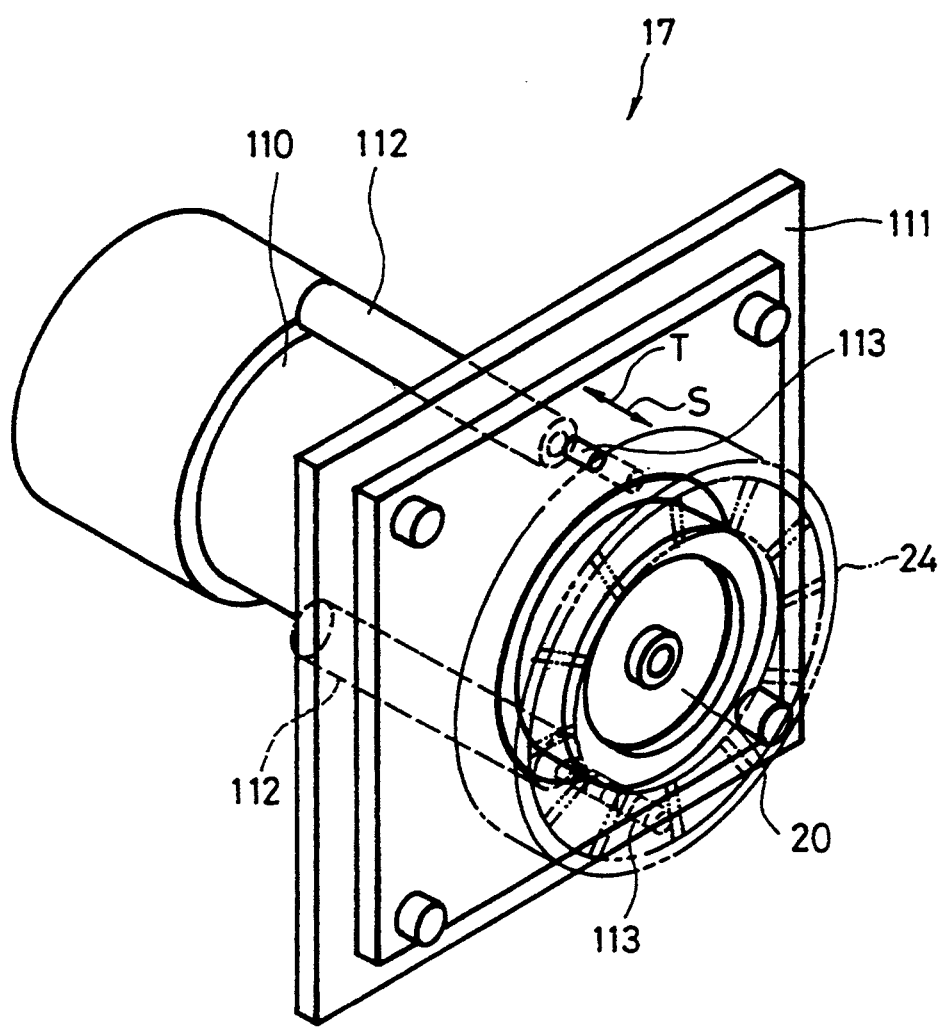
FIG. 14 is a perspective view showing an example of the waste hub ejecting apparatus used in the present invention.

FIG. 14 of the accompanying drawings is a perspective view showing an example of an arrangement of the waste hub ejecting apparatus according to the present invention.

As shown in FIG. 14, an attaching plate 111 to which two air cylinders 112, 112 are attached is secured between the reel base 20 and a reel base mount portion 110.

Rods 113, 113 of these air cylinders 112, 112 can be moved in the directions shown by arrows S and T. When the rods 113, 113 are moved in the direction shown by the arrow S, the hub 24 is pushed out from the reel base 20.

Figure 15A:
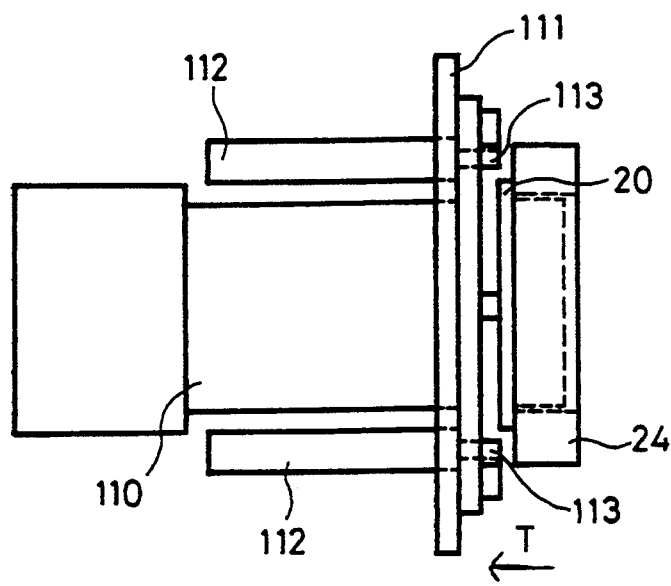
FIGS. 15A through 15C are diagrams used to explain operation of the waste hub ejecting apparatus, respectively.

More specifically, under the condition shown in FIG. 15A, i.e., under the condition such that the reel hub 24 is being rotated (similarly to the condition that the pancake reel 21 is being rotated), the rods 113, 113 of the air cylinders 112, 112 are most deeply entered in the direction shown by an arrow T in FIG. 15A. Under this state, as earlier noted, the nail members 103, 103, 103 of the reel base 20 are opened so that the reel hub 24 is secured to the reel base 20.

Figure 15B:
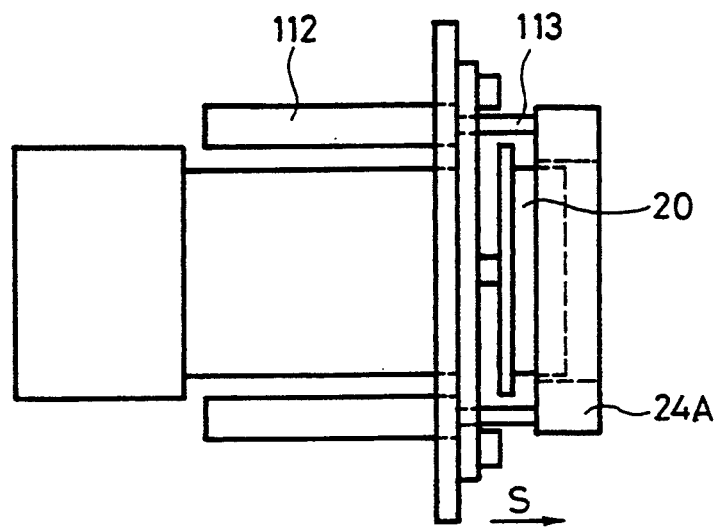

Under the condition shown in FIG. 15B, the rotation of the reel hub 24 is stopped and the nail members 103, 103, 103 are closed, whereafter the rods 113, 113 are moved in the direction shown by an arrow S, whereby the reel hub 24 (hereinafter referred to as the waste hub 24A as already described) is ejected from the reel base 20.

Figure 15C:
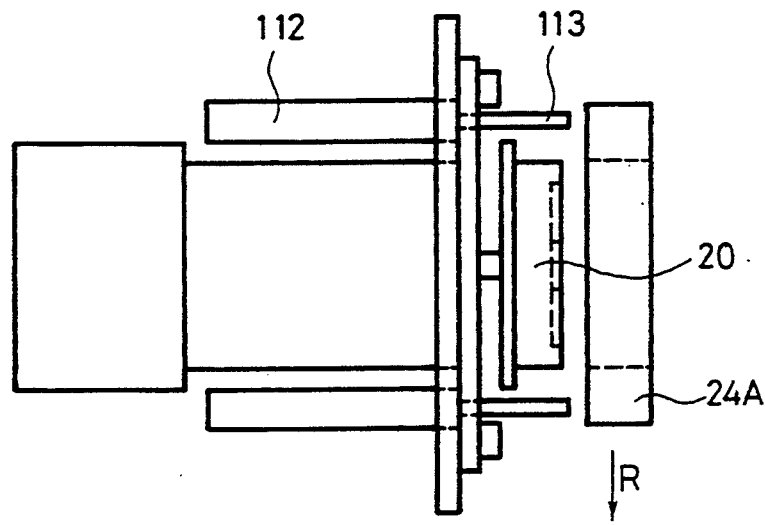

Under the condition shown in FIG. 15C, the rods 113, 113 are further moved in the arrow S direction so that the waste hub 24A is completely ejected from the reel base 20. In this state, the waste hub 24A is freely dropped in the direction shown by an arrow R in FIG. 15C.

Figure 16:
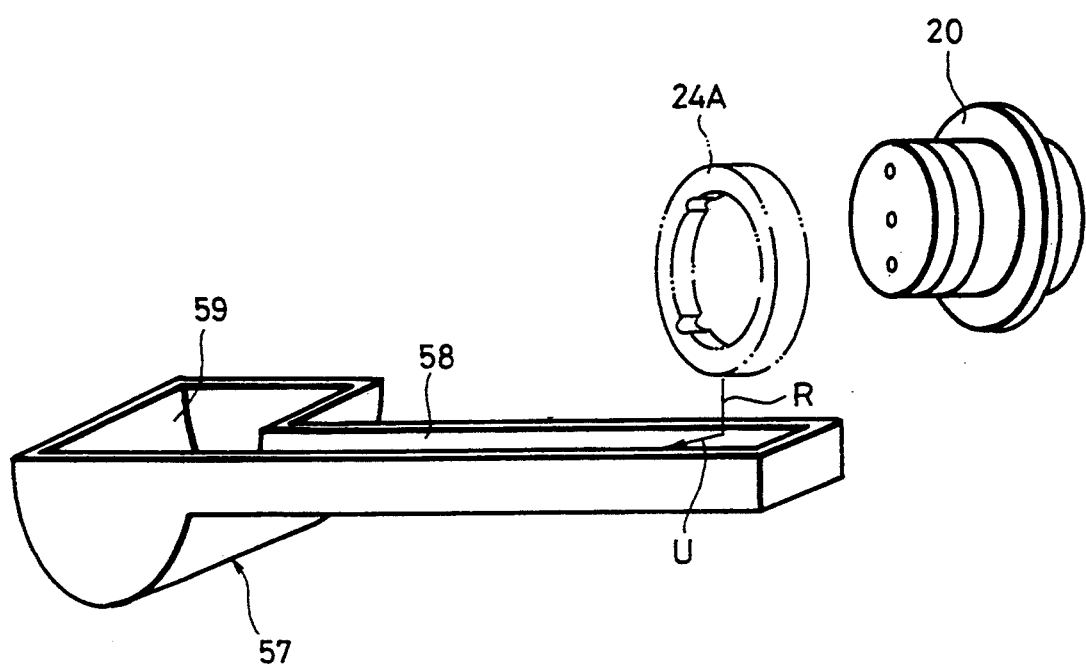
FIG. 16 is a perspective view showing an example of an arrangement of the waste hub recollecting apparatus used in the present invention.

As shown in FIG. 16 of the accompanying drawings, the waste hub 24 that has been freely dropped from the reel base 20 in the arrow R direction is dropped in the upstream side of the conduit portion 58 of the hub recollecting apparatus 57 fixedly disposed under the position at which the waste hub 24 is dropped, rolled over through the inclined conduit portion 58 and then recollected into the hub recollecting unit 59 (see FIGS. 3 and 4).

As described above, according to the embodiment of the present invention, there is provided the auto changer 11 to which at least two pancake reels 21 (22, 23) coaxially disposed in the axial direction 20A of the reel base 20 are loaded. For this reason, the housing of the tape winding apparatus might be formed so as to have a thickness corresponding to the thickness of the pancake reels 21 (22, 23). Therefore, the overall configuration of this tape winding apparatus can be prevented from being increased too much in size and can load thereon two pancake reels 21 (22, 23) or more.

The auto changer 11 includes the openable and closable auto changer arm 30 to which the pancake reel holder 50 is attached. When the auto changer arm 30 is closed, at least one pancake reel 23 is coaxially disposed in the axial direction 20A of the reel base 20. When the auto changer arm 30 is opened, at least one pancake reel 23 can be loaded onto the pancake reel holder 50. Therefore, when one pancake reel 21 is set on the reel base 20, for example, and the magnetic tape 27 is being wound into the cassette 31, the auto changer arm 30 is opened and the spare pancake reel 22 can be loaded onto the pancake reel holder 50 of the auto changer arm 30. Therefore, it is possible to increase the speed the tape winding of the tape winding apparatus.

Furthermore, since the waste hub 24 is dropped into and recollected by the hub recollecting apparatus 57 in which the inclined conduit portion 58 is formed after the magnetic tape 27 that has been wrapped around the pancake reel 21 was wound into the cassette 31, the new pancake reel 22 can be automatically and continuously supplied to the reel base 20. Therefore, the efficiency of the tape winding apparatus of the present invention can be increased.

An automatic splicing operation in which the tape top portion (the leading end portion of the magnetic tape 28) of the new pancake reel 22 and the end portion of the waste tape 27A attracted by the attracting block 53 are spliced with each other will be described below.

Figure 17:
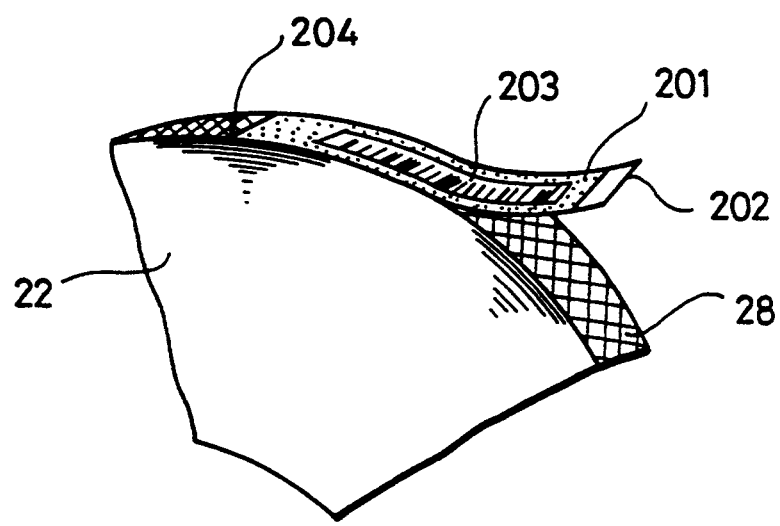
FIG. 17 is a fragmentary perspective view schematically showing a structure of a tape top portion of the pancake reel.
Figure 18:
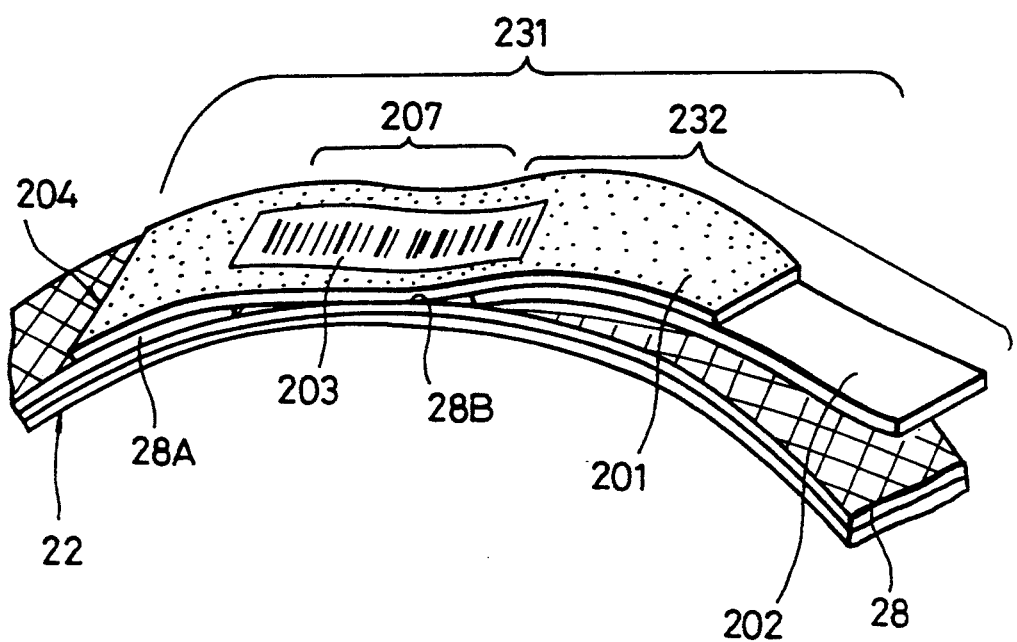
FIG. 18 is a fragmentary perspective view showing a detailed structure of the tape top portion of the pancake reel in an exaggerated fashion.

FIG. 17 of the accompanying drawings schematically shows a structure of the tape top portion (the leading end portion of the magnetic tape 28) of the pancake reel 22. FIG. 18 of the accompanying drawings shows a detailed structure near the above tape top portion in a partly exaggerated fashion.

As shown in FIGS. 17 and 18, one end portion of an adhesive tape 201 whose color (at least one color or more of chromatic color, achromatic color, metal color or chromatic transparent color) is different from that of the magnetic tape 28 is bonded to the tape winding end portion 28A of the magnetic tape 28 in an overlapping fashion. Magnetic tapes are generally colored in black or brown and the color of the adhesive tape 201 is selected to be white.

A central portion (hereinafter referred to as a bonded portion 207) of the adhesive tape 201 is bonded to the surface 28B (see FIG. 18) of the magnetic tape 28 that is wrapped around the underlayer of this adhesive tape 201. The reason for this is to temporarily fasten the adhesive tape 201 in order to prevent the magnetic tape 28 from being tangled. A leader tape 202 is bonded to the other end portion of the adhesive tape 201 in an overlapping fashion. A portion including this leader tape 202 is served as a free end portion 232. The adhesive tape 201 and the leader tape 202 constitute a tape winding end portion 231 (hereinafter referred to as a tape top portion 231, of the magnetic tape 28.

If the leader tape 202 is not bonded to the other end of the adhesive tape 201 and an adhesive tape having no adhesive provided at its top portion is effectively utilized, then the top portion of such adhesive tape can be used as the free end portion. The adhesive tape 201 and the leader tape 202 may be made of paper, cloth or resin.

A bar code 203 is formed on the surface of the adhesive tape 201. The bar code 203 includes an identification (ID) information that is used to identify the kind of the pancake reel 22 or the like. The contents of the ID information might be the content of software copied on the magnetic tape 28, a designated winding speed at which the magnetic tape 28 wound around the pancake reel 22 is wound by the tape winding apparatus shown in FIG. 3 or the like, for example.

After the pancake reel 22 was fixedly loaded onto the reel base 20 automatically, the reel motor 19 is rotated at a relatively slow speed in the direction shown by the arrow G (see FIG. 3) under the control of the control circuit. While the pancake reel 22 is being rotated, a spliced portion 204 (see FIG. 18) between the adhesive tape 201 of the pancake reel 22 and the magnetic tape 28 is detected by means of a photosensor (hereinafter referred to as a photosensor 12,) provided as an optical detecting means served as the tape top detecting apparatus 12.

The photosensor 12 includes a light emitting unit and a light sensing unit. The light emitting unit is composed of a light emitting diode or the like and irradiates light beams on the surface of the magnetic tape 28. On the other hand, as the light sensing unit, there can be utilized a photodiode, phototransistor or CCD (charge-coupled device) sensor or the like which converts the change of light amount of a reflected light from the surface of the magnetic tape 28 into an electrical signal and which outputs the same.

The rotation of the reel motor 19 is stopped after a predetermined time has passed since the spliced portion 204 has been detected by the photosensor 12, whereby the tape top portion of the pancake reel 22 can be automatically brought into the position of the tape top holding and withdrawing apparatus 13.

Figure 19:
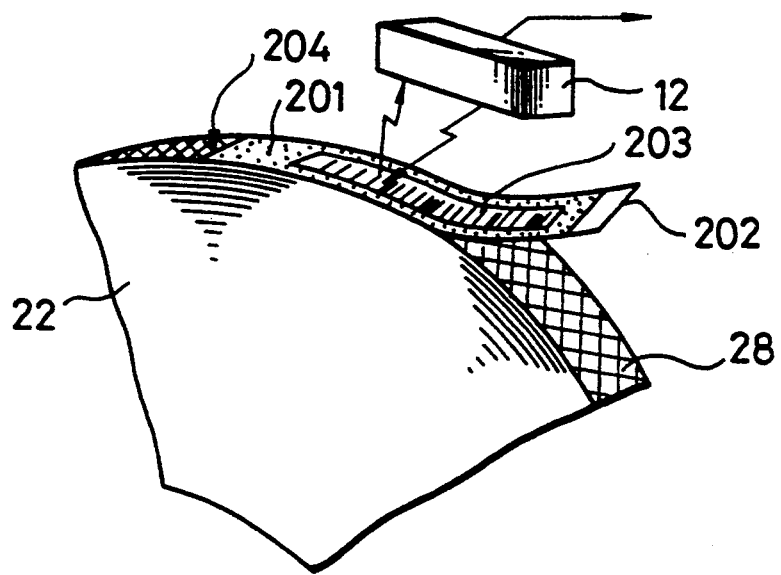
FIG. 19 is a perspective view showing an arrangement such that the bar code formed at the starting portion of the pancake reel is read out by the photosensor.

Until the rotation of the reel motor 19 is stopped after the spliced portion 204 was detected by the photosensor 12, the content of the bar code 203 can be read out by the photosensor 12 as shown in FIG. 19 of the accompanying drawings. The content thus read-out can be stored in a RAM (random access memory) of the control circuit, though not shown.

Figure 20:
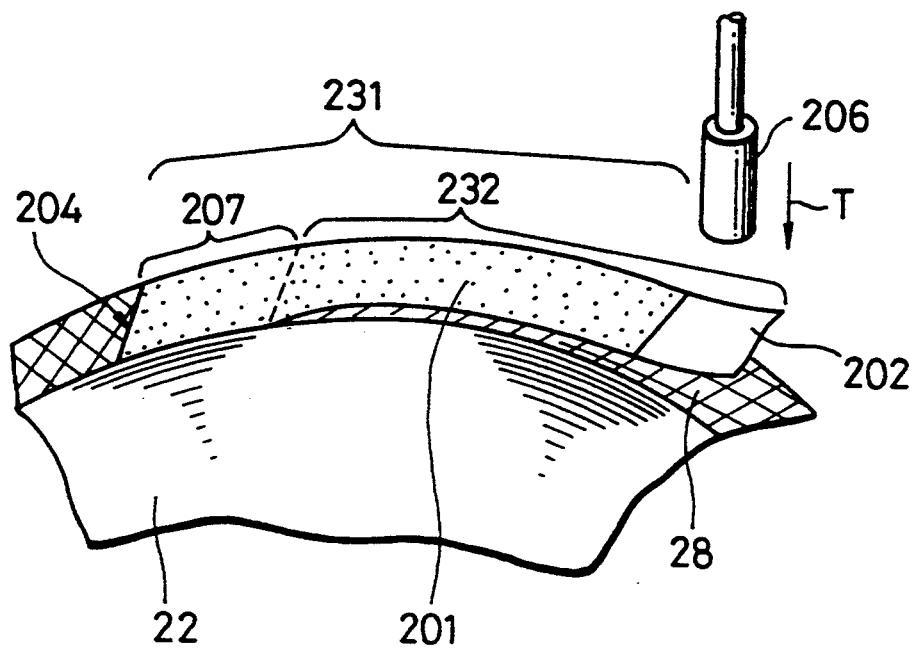
FIG. 20 is a perspective view used to explain the condition before the starting end portion of the pancake reel is held by the arm.

After the pancake reel 22 was stopped at the position facing the tape starting portion holding and withdrawing apparatus 13, as shown in FIG. 20 of the accompanying drawings, an arm 206 serving as a slackening portion forming means is moved in the direction shown by an arrow T (substantially the radial direction of the pancake reel 22 and preferably the exactly radial direction) to thereby push the leader tape 202 on which the tape top portion 231 of the pancake reel 22 is formed toward the magnetic tape 28 side and to hold the same.

Figure 21:
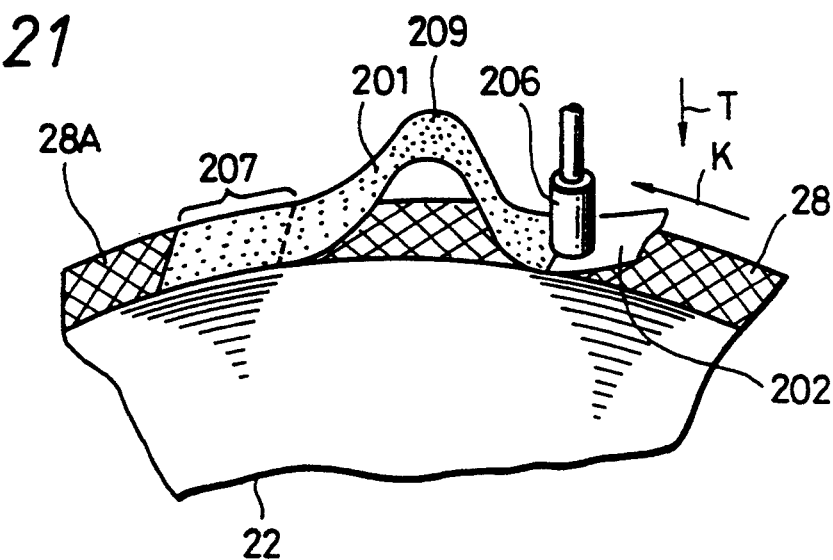
FIG. 21 is a perspective view showing the state such that a slackening portion is formed on the tape top portion of the pancake reel.

Then, as shown in FIG. 21 of the accompanying drawings, while being pushed in the arrow T direction, the arm 206 is moved in the direction of the tape winding end portion 28A, i.e., in the circumference direction that is the direction shown by an arrow K, whereby a slackening portion 209 is formed. While the slackening portion 209 is formed by moving the arm 206 in the arrow K direction under the condition such that the pancake reel 22 is stopped as described above, the present invention is not limited thereto and the following variant is also possible. That is, while the arm 206 is being pushed in the arrow T direction, the pancake reel 22 is moved by the reel motor 19 in the circumference direction of the direction opposite to the arrow K direction, thereby the slackening portion 209 being formed similarly.

The slackening portion 209 can be formed by relatively moving the arm 206 in the circumference direction (in the arrow K direction) as described above. In this case, it is preferable that a non-slip rubber or the like is attached to the arm 206 at its top surface where the arm 206 comes in contact with the leader tape 202.

Figure 22A:
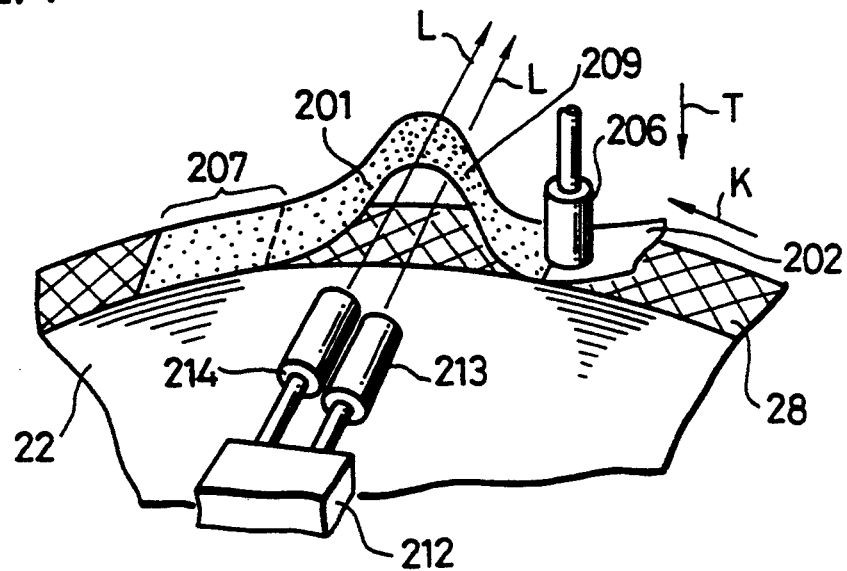
FIG. 22A is a perspective view showing the condition before two arms are inserted into the slackening portion.
Figure 22B:
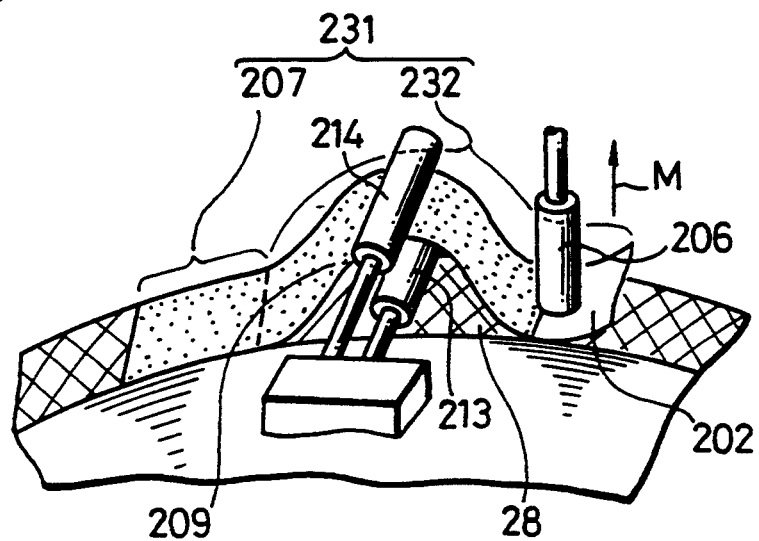
FIG. 22B is a perspective view showing the condition such that the slackening portion is pinched and held by the two arms.
Figure 22C:
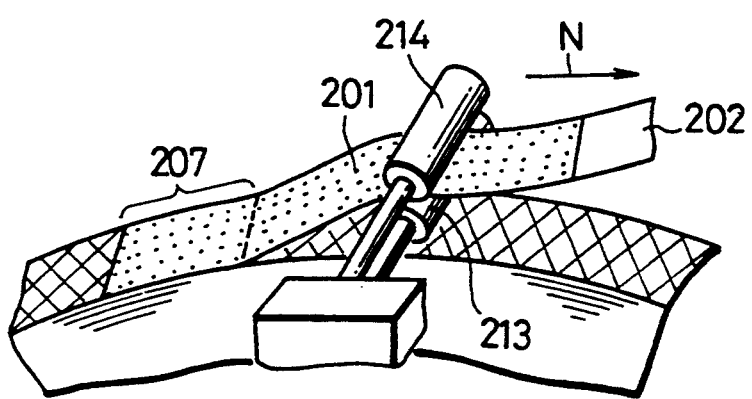
FIG. 22C is a perspective view showing the condition such that the bonding portion is peeled from the tape too portion.

Under the condition that the slackening portion 209 of a predetermined shape is formed, the movement of the arm 206 in the arrow K direction is stopped. In this state, as shown in FIGS. 22A to 22C, two parallel arms 213, 214 accommodated within the arm accommodating portion 212 are moved in the direction shown by arrows L (in the direction substantially parallel to the axial direction of the pancake reel 22), whereby the starting end portion 231 of the pancake reel 22 Can be located between the two arms 213 and 214. By closing the two arms 213 and 214 under this condition, the front and back surfaces of the starting end portion of the pancake reel 22 can be sandwiched and then held. In this case, it is preferable that a non-slip rubber or the like is attached to the arms 213, 214 at their portions whereat the arms 213, 214 sandwich the starting end portion 231 of the pancake reel 22.

Throughout FIGS. 22A to 22C, since the leader tape 202 is bonded to the rear surface of the adhesive tape 201 other than the bonding portion 207 as shown in FIG. 18, the arm 213 can be prevented from being bonded to the rear surface of the leader tape 202.

While the arms 213, 214 serving as the holding means are disposed in parallel to each other as described above in connection with FIGS. 22A to 22C, the present invention is not limited thereto and the arms 213, 214 are formed as substantially a fan-shaped (substantially V-letter configuration) so that, when the fan-shaped portion of the arms 213, 214 are closed, the starting end portion 231 can be sandwiched by the arms 213, 214. Further, while the front and rear surfaces of the starting end portion 231 are sandwiched by the arms 213, 214 as shown in FIG. 22B, the present invention is not limited thereto and the front surfaces of the free end portion 232 may be sandwiched by the arms 213, 214 from substantially the horizontal direction.

Then, the arm 206 is returned to the direction shown by an arrow M (in the direction opposite to the arrow T direction) as shown in FIG. 22B, whereby the leader tape 202 can be served again as the free end portion as shown in FIG. 22C.

Accordingly, by moving the arm accommodating portion 212 in the arrow N direction, the pancake reel 22 is rotated about the reel base 20 in the direction shown by an arrow F (see FIG. 23), whereby the bonding portion 207 is peeled off from the magnetic tape 28.

Figure 23:
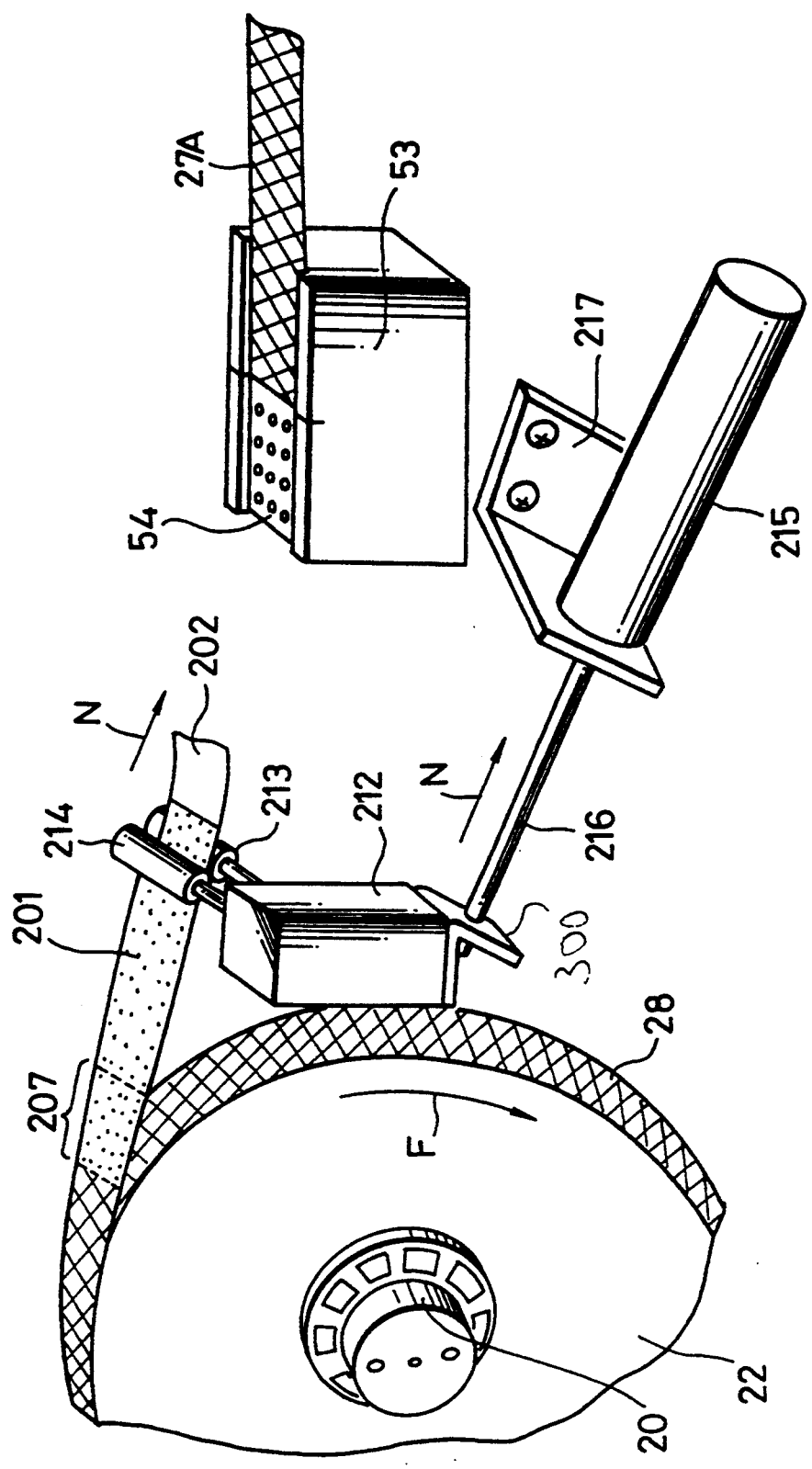

As shown in FIG. 23 of the accompanying drawings, the arm accommodating portion 212 is attached to a metal fitting 300 of substantially L-shaped configuration that is attached to the top portion of a rod 216 of an air cylinder 215. The air cylinder 215 is fixed to the tape winding apparatus body 32 by means of an L-shaped metal fitting 217. Therefore, when the rod 216 is pulled toward the tube side of the air cylinder 215, the arms 213, 214 can be moved in the direction shown by an arrow N, in other words, in the direction in which the tape attracting blocks 53, 54 constructing the tape and second splice apparatus 14 (see FIG. 3) are disposed.

Figure 24:
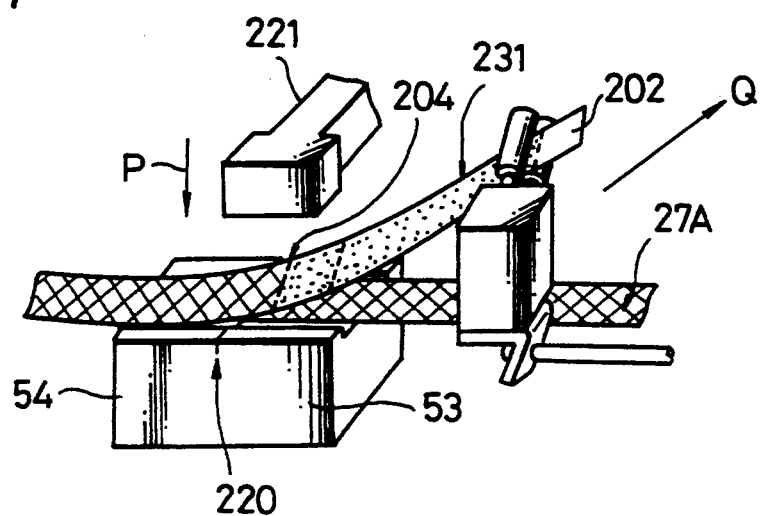

In this case, as shown in FIG. 24 of the accompanying drawings, the starting end portion of the pancake reel 22 can be overrun to the position at which the spliced portion 204 passes a cutting recess 220.

Under the condition shown in FIG. 24, the splice arm 221 having no splice tape is moved in the direction shown by an arrow P to cause the starting end portion of the pancake reel 22 to be attracted on the attracting surface of the attracting block 54. Thereafter, the splicing arm 221 is moved in the direction opposite to the arrow P direction and then the tape is cut by the cutter 52 at the starting end portion 231 of the pancake reel 22 is included (see FIG. 25).

A portion including the withdrawn tape 202 cut and held between the arms 213 and 214 is translated in the arrow Q direction (see FIG. 24) by a translating mechanism (not shown) and then accommodated for disposal within a predetermined accommodation portion (not shown).

Under the condition shown in FIG. 25, the splice arm 221 having the splice tape 222 attached thereto is moved in the arrow P direction and is abutted against the upper portion of the surface in which the magnetic tape 28 and the waste tape 27A are brought in contact with each other (they may be spaced apart by a very small distance), whereby the magnetic tape 28 of the new pancake reel 22 and the waste tape 27A are spliced together by the splice tape 222.

By this splicing, the leader tape within the waste tape winding cassette 61 and the magnetic tape 28 of the new pancake reel 22 are spliced as one tape.

Therefore, by rotating the reel motor 47 (see FIG. 3) on the waste tape winding cassette 61, of the waste tape 27 that need not be wound around the next empty cassette 65 which is the V0 cassette and the new magnetic tape 28 spliced to the waste tape 27A, the top portion which becomes excess can be wound into the waste tape winding cassette 61. The excess top portion can be specified on the basis of the cue signal detected by the cue head if the magnetic tape 28 is the copy tape and also specified on the basis of a count value (corresponding to the length of the tape) of the counter roller 42 if the magnetic tape is a non-recording tape (tape on which nothing is recorded yet).

After the waste tape 27A was wound into the waste tape winding cassette 61, the empty cassette 65 is automatically transported to the position of the tape winding and first splice apparatus 16. Then, at that position, the leader tape of the empty cassette 65 and the magnetic tape 28 are spliced and hence the winding work of the magnetic tape 28 into the empty cassette 61 is started. In this case, the waste winding cassette 61 is returned to the position shown in FIG. 3.

When the pancake reel is not exchanged as described above, the magnetic tape of a predetermined length is wound into the cassette and then that cassette is ejected into the cassette storage tray 62 by the cassette moving arm 66. At that time, a new empty cassette is set at the position of the tape winding and first splice apparatus 16.

In FIG. 4, as already described, the cassette group 75 is the cassette group that is transported in the arrow I direction and set at the position of the cassette 65 shown in FIG. 3. Whereas, the cassette group 76 represents the cassette group that is provided as the cassette product in which the copy tape stored in the cassette storage tray 62 is wound. Accordingly, the product cassette 31A shown in FIG. 3 is sequentially transported in the arrow J direction.

As described above, according to this embodiment of the present invention, this tape winding apparatus comprises the reel base 20, the reel motor 19 which controls the rotation of the reel base 20, the pancake reel 22 loaded onto the reel base 20 or the like, the tape top detecting apparatus (photosensor) which detects the tape top of the magnetic tape 28 wound around the pancake reel 22 or the like, the tape and second splice apparatus 14 and the tape top holding and withdrawing apparatus 13 having the arm 106 serving as the slackening portion forming means.

As shown in FIG. 18, in the pancake reel 22 or the like, the adhesive tape 201 which is different in color from the magnetic tape 28 is bonded to the winding end portion 28A of the magnetic tape 28. One portion of the adhesive tape 28 is temporarily bonded to the surface 28B of the magnetic tape 28 wrapped around the under-layer by means of an adhesive agent (adhesive agent on the adhesive tape 201) so as not to become loose. Also, the remaining portion (e.g., portion to which the withdrawing tape 202 is bonded as shown in FIG. 18) of the thus arranged adhesive tape 201 is served as the free end 232 that constructs the tape top portion 231 of the magnetic tape 28.

The tape top portion 231 of the pancake reel 22 or the like loaded onto the reel base 20 and which is slowly rotated in the arrow G direction is detected by the photosensor 12. The reel motor 19 is stopped in rotation by the output signal (tape end detecting signal) that is generated the photosensor 12 when the photosensor 12 detects the tape top portion 231, to thereby stop the revolution of the reel base 20.

Thereafter, while pushing the free end portion 232 by the arm 206 serving as the slackening forming means from substantially the radial direction of the pancake reel 22 or the like, the pancake reel 22 or the like is relatively moved in the arrow K direction, i.e., the circumference direction by the reel motor 19 or the like, thereby forming the slackening portion 209 on the free end portion 232.

Accordingly, the slackening portion 209 is sandwiched and held from the front and rear surfaces of the slackening portion 209 thus formed by the arm 206 by the tape top withdrawing apparatus 13. Then, under the condition that the slackening portion 209 is being held by the apparatus 13, the free end portion 232 is withdrawn to the position of the tape and second splice apparatus 14, whereby the tape top portion 231 of the magnetic tape 28 wrapped around the new pancake reel 22 or the like and the waste tape 17A can be spliced automatically. There is then the advantage such that the speed and efficiency concerning the winding operation of the tape winding apparatus can be increased.

If a tape having a different color is not bonded to the tape top portion 231 of the pancake reel 22 and one portion of the rewind end portion of the magnetic tape 28 is temporarily bonded by the adhesive agent, then the succeeding splice processing can be automated by moving the tape top portion of the magnetic tape 28 to the position of FIG. 20 in a manual fashion. In this case, the tape top detecting apparatus (photosensor) 12 can be removed.

While the magnetic tape is employed as the copy tape as described above, the present invention is not limited thereto and the present invention can be similarly applied to the non-recording tape.

As described above, according to a first aspect of the present invention, since the tape winding apparatus comprises the slackening portion forming means and the slackening portion holding means for holding the slackening portion formed by the slackening forming means, the tape top portion, which is the winding end portion of the pancake reel, can be held with ease. Consequently, the tape top portion can be withdrawn with ease to the splice apparatus by moving the holding means.

According to a second aspect of the present invention, since the tape winding apparatus includes the slackening portion forming means and the holding means for holding the slackening portion formed by this slackening portion forming means, the tape top portion, which is the winding end portion of the pancake reel, can be held with ease. Also, since the color of the tape top portion is made different from that of the magnetic tape. The tape top can be detected with ease by the optical detecting means, for example.

Consequently, there is then the possibility such that, after the tape top portion of the pancake reel was automatically detected by the above optical detecting means, the tape top portion can be withdrawn to the position of the splice apparatus while the slackening portion formed by the slackening portion forming means is being held.

Operation in which the waste tape 27A and the top portion (waste tape 27A, etc.), which becomes excess in the new magnetic tape 28 spliced to the waste tape 27A, are wound around the waste tape winding cassette 61 constructing the waste tape winding apparatus 18 will be described with reference to FIGS. 26A to 26G.

Incidentally, this waste tape winding apparatus 18 is made by utilizing the technique of a tape winding apparatus (splicing and loading of tape into cassettes) described in U.K. Patent GB 21799327 (publicated on Mar. 21, 1990) and will therefore be described briefly.

Figure 26A:
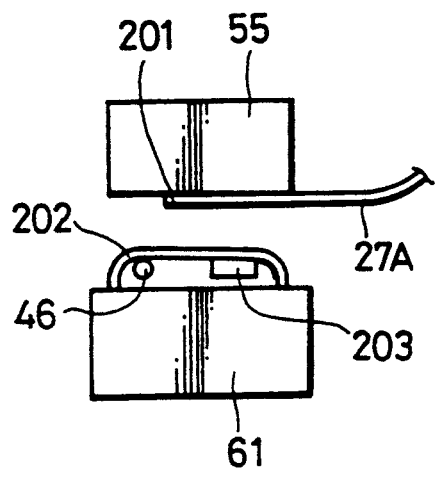

Initially, as shown in FIG. 26A, under the condition that a top portion 201 of the waste tape 27A is attracted to the attracting block 55, a lid (not shown) of the waste tape winding cassette 61 is opened by a lid opening mechanism (not shown). Then, the leader tape guide roller 46 and a tape attracting arm 203 are disposed in the inside of a leader tape 202 within the waste tape winding cassette 61. This leader tape 202 may be a leader tape that was initially wrapped into the waste tape winding cassette 61 or a waste tape or the like if the waste tape was already wound. In order to avoid the confusion, this leader tape 202 will be referred to as an in-cassette tape, as necessary, in the description which follows.

Figure 26B:
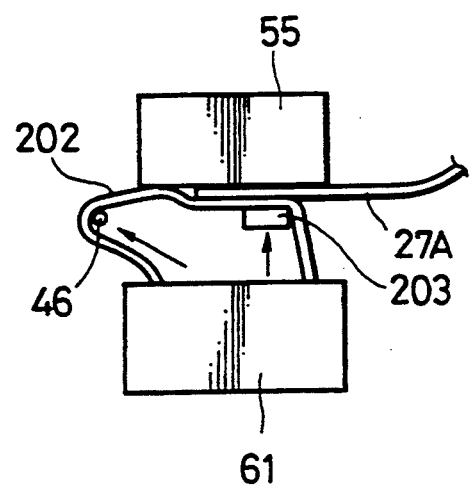
Figure 26C:
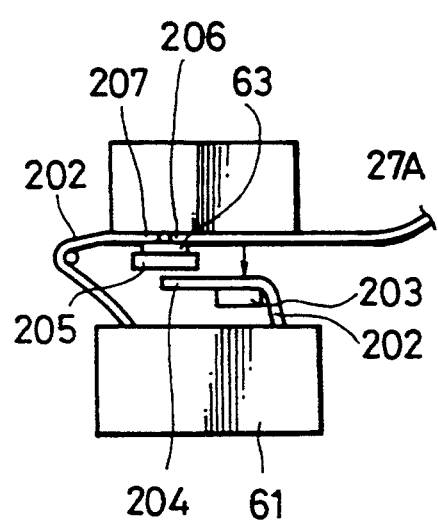
Figure 26D:
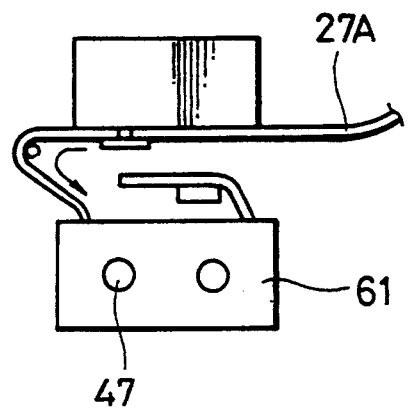

Then, as shown by an arrow in FIG. 26B, the leader guide roller 46 and the tape attracting arm 203 are moved, thereby attracting the in-cassette tape 302 to the attracting block 55.

Then, the cutter 48 (see FIG. 3) is moved in the direction perpendicular to the plane of the drawing to cut the in-cassette tape 202. Also, the tape attracting arm 203 is moved as shown by an arrow in FIG. 26C while attracting one end portion 204 of the in-cassette tape 202. Thereafter, the splice arm 205 is moved to the position shown in FIG. 26C from the direction perpendicular to the plane of the drawing and the top portion 206 of the waste tape 27A and the other end portion 207 of the in-cassette tape 202 are spliced together by the piece of splice tape 63.

Therefore, the in-cassette tape 202 and the waste tape 27A are spliced as one tape. Then, after the splice arm 206 was moved backwardly in the direction perpendicular to the plane of the drawing, the S-reel motor 47 is rotated under the condition that the attracting state of the attracting block 55 is released, whereby the waste tape 27A or the like is moved in the direction shown by an arrow in FIG. 26D and then wound into the waste tape cassette 61. A tape attracting surface (tape sliding surface) of the attracting block 55 has a cross section of substantially channel-like configuration so that the waste tape 27A can be prevented from being disengaged from the above tape sliding surface because the waste tape 27A is applied with a tension by the leader tape guide roller 46 and the guide roller 45 (see FIG. 3).

After the waste tape 27A was wound into the waste tape winding cassette 61 and the spliced portion (see FIG. 25) between the waste tape 27A and the magnetic tape 28 also was wound into the waste tape winding cassette 61, the S-reel motor 47 is stopped such that the winding operation of the magnetic tape 28A into the waste tape winding cassette 61 is finished at a predetermined position of the magnetic tape 28 on the basis of the cue signal or the like as described above (see FIG. 26E).

Figure 26E:
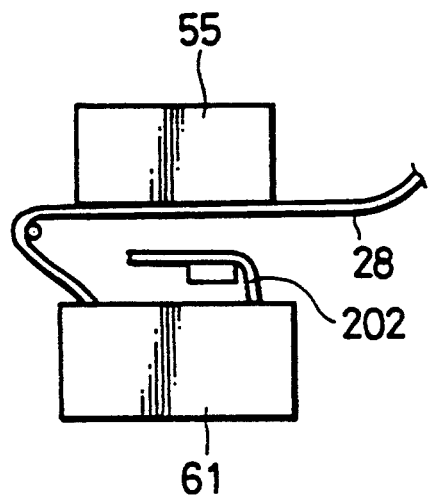

Then, under the condition shown in FIG. 26E, the attracting operation of the attracting block 55 is started and the magnetic tape 28A is cut by the cutter 48. The tape attracting arm 203 is then moved in the direction shown by an arrow in FIG. 26F and set over the magnetic tape 28A. After the splice arm 205 was moved forwardly from the direction perpendicular to the plane of the drawing and moved in the direction shown by an arrow in FIG. 26F, one end portion 204 and the in-cassette tape 202 and a cut-out end portion 207 wound around the waste tape winding cassette 61 side of the magnetic tape 28A are spliced by means of the piece of the splice tape 63. Accordingly, the S-reel motor 47 (or T-reel motor 208) is rotated to allow the in-cassette tape 202 of loop configuration to be wound into the waste tape winding cassette 61. Also, the lid of the waste tape winding cassette is closed.

Figure 26F:
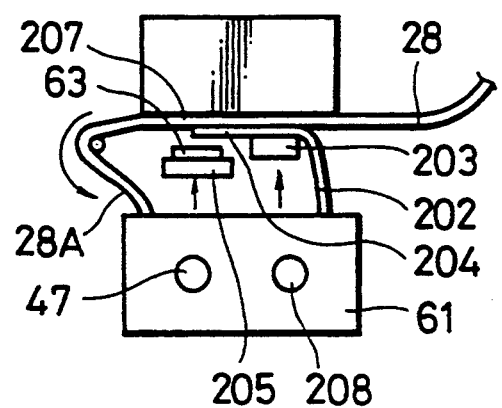
Figure 26G:
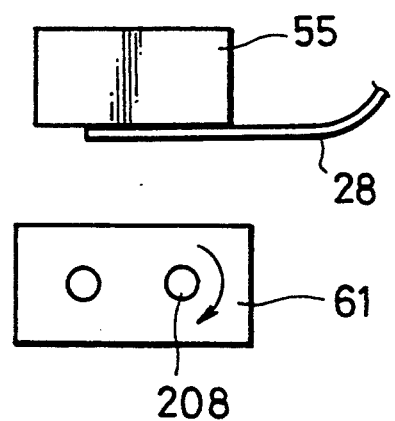

In this way, the waste tape 27A is completely wound into the waste tape cassette 61 (see FIG. 26G). Incidentally, under this condition, when the next waste tape is wound, a portion that is the same as that spliced in FIG. 26F is cut and spliced. To avoid this, the T-reel motor 208 is rotated in the arrow direction of FIG. 26F to thereby rewind the in-cassette tape 202 by a length of about 10 cm. If this winding amount is selected to be about 166 of the wound waste tape 27A or the like, for example, the waste tape 27A or the like can be wound around not only the reel of the S-reel motor 47 side but also around the reel of the T-reel motor 208 side. Therefore, a frequency by which the waste tape winding cassette 61 is replaced can be reduced.

In this case, if the waste tape 27A of about 200 m or the like is wound into the waste tape cassette 61, then the winding amount within the waste tape cassette 61 reaches its limit so that the waste tape cassette 61 must be replaced with other empty cassette 65. This exchanging period can automatically be determined on the basis of the winding number of the waste tape 27A or the count value of the counter roller 42. The waste tape cassette 61 can be exchanged either in a manual fashion or automatically. Upon exchange, since all waste tapes 27A are accommodated within the cassette (waste winding cassette 61), there is then no such disadvantage that was already described in the description of the prior art. More specifically, dust such as magnetic powders or the like can be prevented from being scattered. Therefore, the tape winding apparatus of the present invention is suitable for use within the so-called clean room.

According to the above-mentioned operation, the winding starting portion of the pancake reel 22 or the like and/or the winding end portion of the pancake reel is wound as the waste tape 27A or the like into the waste tape winding cassette 61 which has the same configuration and arrangement as those of the empty cassette 31. In other words, of the magnetic tape 28 or the like pulled out from the pancake reel 22 or the like, the waste tape is wound into the waste tape winding cassette 61 and then accommodated therein. An amount in which the waste tape 27A can be wound into one waste tape winding cassette 61 corresponds to the amount of waste tapes produced by 50 to 100 pancake reels 28 or the like.

Operation of the tape winding and first splice apparatus 16 will be described in detail in association with the movement and operation of the cassette moving arm 66 and the waste tape winding cassette 61 with reference to FIGS. 27A, 27B through FIGS. 37A, 37B. In FIGS. 27A, 27B through FIGS. 37A, 37B, FIGS. 27A through 37A show plan views respectively and FIGS. 27B through 37B show front views, respectively.

FIGS. 27A, 27B show the condition such that the tape winding apparatus of the present invention is activated. As shown in FIGS. 27A, 27B, the tape winding and first splice apparatus 16 fundamentally include a cassette winding apparatus 350 and a cassette loading apparatus 351.

On both sides of the cassette winding apparatus 350 and the cassette loading apparatus 351, there are disposed the cassette moving arm 66, an empty cassette tray 352 and the cassette eject tray 62, respectively.

The waste tape winding cassette 61 is loaded onto the cassette moving arm 66 disposed in front of the empty cassette tray 352. A number of empty cassettes 65 are loaded onto the empty cassette tray 352. The cassette eject tray 62 includes a moving apparatus 353 of the cassette into which the tape was already wound (i.e., product cassette 31A: see FIG. 3). In this case, when the operation of the tape winding apparatus is just started, the product cassette 31A is not loaded onto the cassette eject tray 62 at all.

Under the condition shown in FIGS. 27A, 27B, the cassette group 75 is pushed in the arrow I direction and hence a first empty cassette 65 is loaded onto the cassette moving arm 66 as shown in FIGS. 28A, 28B. Throughout FIGS. 28A, 28B to FIGS. 34A, 34B, the moving apparatus 353 (see FIGS. 27A, 27B) are omitted, in order to simplify the description which follows.

Then, as shown in FIGS. 29A, 29B, the cassette moving arm 66 is moved by a distance l1 in the arrow H direction, whereby the empty cassette 65 is loaded onto the cassette loading apparatus 351.

Under this state, as shown in FIGS. 30A, 30B, the cassette loading apparatus 351 is moved in the arrow R direction, whereby the empty cassette 65 is loaded onto the cassette winding apparatus 350. After the empty cassette 65 was loaded onto the apparatus 350, the leader tape within the empty cassette 65 and the end portion of the magnetic tape held in the attracting block 55 (see FIG. 26) are spliced, whereafter the reel motor 47 is rotated to rewind the magnetic tape (useful tape such as a copy tape or non-use tape) into the empty cassette 65.

While the magnetic tape is being wound into the empty cassette 65 by the cassette winding apparatus 350, as shown in FIGS. 31A, 31B, the waste tape winding cassette 61 is returned to the original position by moving the cassette moving arm 66 by the distance l1 in the arrow S direction. The empty cassette 65 in which the magnetic tape is being wound will hereinafter be referred to as a winding cassette 65A.

After the magnetic tape of the predetermined amount was wound in the empty-cassette 65, as earlier noted with reference to FIGS. 26A through 26G, the magnetic tape is cut. The magnetic tape thus cut and the other end of the leader tape within the winding cassette 65A are spliced, thereafter a cassette in which the winding of the magnetic tape was finished (this cassette will hereinafter be referred to as a winding-finished tape cassette 65B) is returned to the position shown in FIGS. 32A and 32B by moving the cassette loading apparatus in the arrow Y direction. Up to that time, the next empty cassette 65 is loaded onto the cassette moving arm 66.

When the cassette moving arm 66 is moved by the distance l1 in the arrow H direction as shown in FIGS. 33A, 33B from the states shown in FIGS. 32A and 32B, the winding-finished cassette 65B is pushed toward the top portion of the cassette moving arm 66 and then transported into the cassette eject tray 62. At that time, the next empty cassette 65 is loaded onto the cassette loading apparatus 351.

Under the condition shown in FIGS. 32A and 32B, when the rod of the moving apparatus 353 which is formed of the air cylinder is projected in the arrow R direction as shown in FIGS. 34A and 34B, the winding-finished cassette 65B is moved by a distance longer than the thickness of one cassette in the depth direction of the cassette eject tray 62 (in the arrow R direction). The reason for this is to avoid the next winding-finished cassette from colliding with another cassette, which was ejected to the cassette eject tray 62 before, i.e., the winding-finished cassette 65B in this case, when the next winding-finished cassette is ejected to the cassette eject tray 62. After the second empty cassette 65 is loaded onto the cassette winding apparatus 350 by the cassette loading apparatus 351 and spliced to the end of the magnetic tape, the winding operation on the second cassette 65 is started.

The useful tape is sequentially wound into the empty cassettes 65 as shown in FIGS. 27A, 27B through FIGS. 34A, 34B.

The movement of the waste tape winding cassette 61 will be described below with reference to FIGS. 35A, 35B through FIGS. 37A, 37B.

As earlier described with reference to FIGS. 27A, 27B through FIGS. 34A, 34B, the waste tape winding cassette 61 is moved together with the cassette moving arm 66 except when the waste tape 27A or the like is wound into the waste tape winding cassette 61.

In actual practice, when the waste tape 27A is wound, as shown in FIGS. 35A and 35B, the waste tape winding cassette 61 is loaded onto the cassette loading apparatus 351.

As shown in FIGS. 36A and 36B, the waste tape winding cassette 61 is moved to the position of the cassette winding apparatus 350 by the cassette loading apparatus 351 in the arrow R direction from the states shown in FIGS. 35A, 35B and then loaded onto the cassette winding apparatus 350. After the waste tape winding cassette 61 was loaded onto the cassette winding apparatus 350, as already described with reference to FIG. 26, the in-cassette tape 202 and the waste tape are spliced, whereafter the waste tape or the like is wound into the waste tape winding cassette 61.

Then, when the waste tape winding cassette 61 is moved in the arrow Y direction by the cassette loading apparatus 351 from the states shown in FIGS. 37A, 37B and then set on the cassette moving arm 66, the winding operation of the waste tape into the waste tape winding cassette 61 is finished.

As described above, according to this embodiment, since the waste tape 27A is the same tape as the magnetic tape 27 or the like such as the copy tape or the like, the waste tape 27A or the like is wound into the waste tape winding cassette 61 that is the same type of cassette as the cassette 31 in which the magnetic tape 27 is wound.

Therefore, the tape winding and first splice apparatus 16, which is a part of the tape winding apparatus, can be served also as the waste tape winding apparatus 18. Hence, the mechanical parts, specially prepared for the waste tape winding apparatus 18, are not needed, which can provide the inexpensive and small tape winding apparatus.

Moreover, since the waste tape 27A is wound into the waste tape winding cassette 61, dust such as magnetic powder or the like can be prevented from being scattered and hence the tape winding apparatus of the present invention can be suitably utilized in the clean room.

Further, while the magnetic tape 27 or the like is the copy tape as described above, the present invention is not limited thereto and can be similarly applied to the non-recording tape (virgin tape).

As set forth, according to the tape winding apparatus of the present invention, since the waste tape is of the type similar to the useful tape such as the copy tape or the like, the above waste tape can be wound into the cassette other than the cassette in which the above useful tape is wound.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A tape winding apparatus in which a tape is drawn from a pancake reel loaded onto a reel base and the tape thus drawn is wound and accommodated within a cassette, comprising:
   means for bonding a portion of a leading end of the tape wound on the pancake reel to a surface of an underlying layer of the tape, whereby the leading end is prevented from becoming loose and another portion of the leading end defines a free end of said magnetic tape;
   slack forming means for forming a slack portion in the tape and being movable in a radial direction relative to the pancake reel to engage said free end and push said free end in said radial direction, and being further movable in a circumferential direction relative to the pancake reel to form a slack portion in said free end while pushing said free end; and
   holding means for holding the tape in a position for maintaining the slack formed by said slack forming means.

2. A tape winding apparatus according to claim 1, wherein said holding means comprises two parallel arms arranged for movement in a direction substantially parallel to an axial direction of the pancake reel.

3. The tape winding apparatus according to claim 2, wherein said two parallel arms are arranged for opening and closing, wherein upon closing said two arms are arranged respectively on top and bottom surfaces of the free end of the tape for holding the tape.

4. The tape winding apparatus according to claim 3, wherein said holding means further comprises means for moving said two parallel arms while said two arms are holding the tape, thereby moving the tape in a circumferential direction relative to the pancake reel.

5. The tape winding apparatus according to claim 4, further comprising: a slice apparatus arranged proximate said holding means and including a tape attracting block having a cutting recess formed therein and a splicer arm movable relative to said tape attracting block.

6. The tape winding apparatus according to claim 5, wherein said splicer arm further includes a cutter for cutting the tape held by said tape attracting block.

7. The tape winding apparatus according to claim 6, wherein said means for moving said two parallel arms comprises an air cylinder.

8. A tape winding apparatus in which a tape is drawn from a pancake reel loaded onto a reel base and the tape thus drawn is wound and accommodated within a cassette, comprising:
   a leading end of the tape wound on the pancake reel having a different color than a color of a remainder of the tape, and means for bonding one portion of the different color leading end to a surface of an underlying layer of the tape wound on the pancake reel, whereby said leading end is prevented from becoming loose and another portion of the different color leading end defines a free end of said magnetic tape;
   slack forming means for forming a slack portion in the tape and being movable in a radial direction relative to the pancake reel to engage said free end and push said free end in said radial direction, and being further movable in a circumferential direction relative to the pancake reel to form a slack portion in said free end while pushing said free end; and
   holding means for holding the tape in a position for maintaining the slack formed by said slack forming means.

9. A tape winding apparatus according to claim 8, wherein said holding means comprises two parallel arms arranged for movement in a direction substantially parallel to an axial direction of the pancake reel.

10. The tape winding apparatus according to claim 9, wherein said two parallel arms are arranged for opening and closing, wherein upon closing said two arms are arranged respectfully on top and bottom surfaces of the free end of the tape for holding the tape.

11. The tape winding apparatus according to claim 10, wherein said holding means further comprises means for moving said two parallel arms while said two arms are holding the tape, thereby moving the tape in a circumferential direction relative to the pancake reel.

12. The tape winding apparatus according to claim 11, further comprising: a splice apparatus arranged proximate said holding means and including a tape attracting block having a cutting recess formed therein and a splicer arm movable relative to said tape attracting block.

13. The tape winding apparatus according to claim 12, wherein said splicer arm further includes a cutter for cutting a tape held by said tape attracting block.

14. The tape winding apparatus according to claim 13, wherein said means for moving said two parallel arms comprises an air cylinder.

* * * * *

UNITED STATES PATENT AND TRADEMARK OFFICE
CERTIFICATE OF CORRECTION

PATENT NO.   : 5,366,174
DATED        : November 22, 1994
INVENTOR(S)  : Hideharu Tsukamoto, Shiro Matsuzaki, and Yoshihiko Miyasaka It is certified that error appears in the above-identified patent and that said Letters Patent is hereby corrected as shown below:

Col.1, line 61, change "show" to --shown--
    line 67, after "reels" insert --,--
Col.2, line 8, delete "side"
    line 21, change "work" to --process--
    line 23, delete "ratio"
Col.3,
    line 21, delete "the"
Col.4, line 15, after "end" first occurrence, insert --portion--
Col.5, line 51, change "too" to --top--
    line 52, change "FIG," to --FIG.--
    line 55, change "FIG," to --FIG.--
Col.7, line 1, change "tame" to --tape--
Col.8, line 45, change "near end" to --end (near--
    same line, delete "side"
Col.9, line 13, after "tray" insert --62--
    line 43, change "23" to --53--
Col.10, line 31, change "6g" to --69--
    line 47, after "70" insert --.--
Col.14, line 40, after "the" second occurrence insert --trailing--
Col.15, line 2, after "231," insert --)--
Col.16, line 25, change "Can" to --can--
Col.17, line 19, delete "is included"

UNITED STATES PATENT AND TRADEMARK OFFICE
CERTIFICATE OF CORRECTION

PATENT NO. : 5,366,174
DATED : November 22, 1994
INVENTOR(S) : Hideharu Tsukamoto, et al It is certified that error appears in the above-identified patent and that said Letters Patent is hereby corrected as shown below:

Col.19, line 25, change "The" to --the--
Col.20, line 56, change "166" to --1/3--
Col.22, line 17, after "empty" delete "-"
      line 21, change "thereafter" to --whereafter--
Col.23, line 42, change "the" third occurrence, to --a--

Signed and Sealed this

Seventh Day of April, 1998

Attest:

BRUCE LEHMAN

Attesting Officer     Commissioner of Patents and Trademarks